(12) United States Patent
Ishizumi

(10) Patent No.: US 12,210,308 B2
(45) Date of Patent: Jan. 28, 2025

(54) METHOD FOR CORRECTING POSITIONAL SHIFT OF IMAGE

(71) Applicant: CANON KABUSHIKI KAISHA, Tokyo (JP)

(72) Inventor: Keisuke Ishizumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/200,787

(22) Filed: May 23, 2023

(65) Prior Publication Data

US 2023/0384726 A1 Nov. 30, 2023

(30) Foreign Application Priority Data

May 26, 2022 (JP) ................................. 2022-086233

(51) Int. Cl.
*G03G 15/00* (2006.01)
*G03G 15/01* (2006.01)
*G06K 15/02* (2006.01)

(52) U.S. Cl.
CPC ..... *G03G 15/5054* (2013.01); *G03G 15/0189* (2013.01); *G03G 15/5058* (2013.01); *G06K 15/1876* (2013.01); *G03G 2215/00059* (2013.01)

(58) Field of Classification Search
CPC .......... G03G 15/5054; G03G 15/5058; G03G 2215/00042; G03G 2215/00059
See application file for complete search history.

(56) References Cited

U.S. PATENT DOCUMENTS

| 8,744,325 B2 | 6/2014 | Ino et al. |
| 2013/0064564 A1* | 3/2013 | Kubota .............. G03G 15/5033 399/72 |
| 2018/0032015 A1* | 2/2018 | Lee .................... G03G 15/5054 |

FOREIGN PATENT DOCUMENTS

| JP | 2012-003234 A | 1/2012 |
| JP | 2013-007930 A | 1/2013 |
| JP | 2019-117359 A | 7/2019 |

* cited by examiner

*Primary Examiner* — Carla J Therrien
(74) *Attorney, Agent, or Firm* — Venable LLP

(57) ABSTRACT

An image forming apparatus receives light from an intermediate transfer member or a correction pattern. The pattern includes an overlapping pattern on which a first monochromatic toner image is formed as a lower layer and a second monochromatic toner image having a smaller area than the first monochromatic toner image is formed as an upper layer. The image forming apparatus controls a plurality of image forming units to form the overlapping pattern such that a dynamic range becomes less than 1.0 and greater than 0.5.

20 Claims, 22 Drawing Sheets

FIG. 9A

| | Y COVERAGE MODULATION [%] | Y OUTPUT [V] | Bk COVERAGE MODULATION [%] | Bk OUTPUT [V] | DYNAMIC RANGE | Y EDGE DETECTION | Bk EDGE DETECTION | STABILITY |
|---|---|---|---|---|---|---|---|---|
| EMBODIMENT 1 | 100 | 3.2 | 90 | 0.59 | 0.90 | ○ | ○ | ◎ |
| EMBODIMENT 2 | 100 | 3.2 | 80 | 0.88 | 0.80 | ○ | ○ | ◎ |
| EMBODIMENT 3 | 100 | 3.2 | 70 | 1.17 | 0.70 | ○ | ○ | ○ |
| EMBODIMENT 4 | 100 | 3.2 | 60 | 1.46 | 0.60 | ○ | ○ | ○ |
| EMBODIMENT 5 | 90 | 2.9 | 100 | 0.3 | 0.90 | ○ | ○ | ◎ |
| EMBODIMENT 6 | 80 | 2.6 | 100 | 0.3 | 0.79 | ○ | ○ | ◎ |
| EMBODIMENT 7 | 70 | 2.3 | 100 | 0.3 | 0.69 | ○ | ○ | ◎ |
| EMBODIMENT 8 | 60 | 2.0 | 100 | 0.3 | 0.59 | ○ | ○ | ○ |
| EMBODIMENT 9 | 90 | 2.9 | 90 | 0.56 | 0.81 | ○ | ○ | ◎ |
| EMBODIMENT 10 | 80 | 2.6 | 80 | 0.76 | 0.63 | ○ | ○ | ◎ |

FIG. 9B

| | Y COVERAGE MODULATION [%] | Y OUTPUT [V] | Bk COVERAGE MODULATION [%] | Bk OUTPUT [V] | DYNAMIC RANGE | Y EDGE DETECTION | Bk EDGE DETECTION | STABILITY |
|---|---|---|---|---|---|---|---|---|
| COMPARATIVE EXAMPLE 1 | 100 | 3.2 | 50 | 1.75 | 0.50 | ○ | × | — |
| COMPARATIVE EXAMPLE 2 | 100 | 3.2 | 40 | 2.04 | 0.40 | ○ | × | — |
| COMPARATIVE EXAMPLE 3 | 100 | 3.2 | 30 | 2.33 | 0.30 | ○ | × | — |
| COMPARATIVE EXAMPLE 4 | 100 | 3.2 | 20 | 2.62 | 0.20 | ○ | × | — |
| COMPARATIVE EXAMPLE 5 | 100 | 3.2 | 10 | 2.91 | 0.10 | ○ | × | — |
| COMPARATIVE EXAMPLE 6 | 50 | 1.7 | 100 | 0.3 | 0.48 | × | × | — |
| COMPARATIVE EXAMPLE 7 | 40 | 1.4 | 100 | 0.3 | 0.38 | × | × | — |
| COMPARATIVE EXAMPLE 8 | 30 | 1.1 | 100 | 0.3 | 0.28 | × | × | — |
| COMPARATIVE EXAMPLE 9 | 20 | 0.8 | 100 | 0.3 | 0.17 | × | × | — |
| COMPARATIVE EXAMPLE 10 | 10 | 0.5 | 100 | 0.3 | 0.07 | × | × | — |

FIG. 9C

| | Y COVERAGE MODULATION [%] | Y OUTPUT [V] | Bk COVERAGE MODULATION [%] | Bk OUTPUT [V] | DYNAMIC RANGE | Y EDGE DETECTION | Bk EDGE DETECTION | STABILITY |
|---|---|---|---|---|---|---|---|---|
| COMPARATIVE EXAMPLE 11 | 50 | 1.7 | 50 | 1.00 | 0.24 | × | × | — |
| COMPARATIVE EXAMPLE 12 | 40 | 1.4 | 40 | 0.96 | 0.15 | × | × | — |
| COMPARATIVE EXAMPLE 13 | 30 | 1.1 | 30 | 0.86 | 0.08 | × | × | — |
| COMPARATIVE EXAMPLE 14 | 20 | 0.8 | 20 | 0.70 | 0.03 | × | × | — |
| COMPARATIVE EXAMPLE 15 | 10 | 0.5 | 10 | 0.48 | 0.01 | × | × | — |
| COMPARATIVE EXAMPLE 16 | 70 | 2.3 | 70 | 0.90 | 0.48 | ○ | ○ | △ |
| COMPARATIVE EXAMPLE 17 | 60 | 2.0 | 60 | 0.98 | 0.35 | ○ | ○ | △ |

COMPARATIVE EXAMPLE 6

COMPARATIVE EXAMPLE 11

FIG. 21

| Y EXPOSURE AREA TONE VALUE | Bk EXPOSURE AREA TONE VALUE | GHOSTING |
|---|---|---|
| 100.0% | 100.0% | C |
| 99.0% | 99.0% | B |
| 98.0% | 98.0% | B |
| 97.0% | 97.0% | A |
| 96.0% | 96.0% | A |
| 99.0% | 100.0% | C |
| 98.0% | 100.0% | C |
| 97.0% | 100.0% | B |
| 100.0% | 99.0% | B |
| 100.0% | 89.0% | B |
| 100.0% | 97.0% | A |

METHOD FOR CORRECTING POSITIONAL SHIFT OF IMAGE

BACKGROUND OF THE INVENTION

Field of the Invention

The present disclosure relates to a method for correcting a positional shift of an image.

Description of the Related Art

An electrophotographic image forming apparatus forms a full-color image by sequentially superimposing toner images of different colors (such as yellow, magenta, cyan, and black). A phenomenon in which transfer positions of toner images of different colors are shifted from each other is referred to as a color shift. When a color shift occurs, an output image (an image printed on a sheet) cannot sufficiently reproduce an input image (an image displayed on a display or a document). According to Japanese Patent Laid-Open No. 2019-117359, it is described that toner patches for correcting a color shift are formed on an intermediate transfer belt, and a timing at which an electrostatic latent image is formed such that the color shift can be decreased is corrected by detecting the toner patches.

According to Japanese Patent Laid-Open No. 2019-117359, forming overlapping patches by overlapping a black patch on a yellow patch, overlapping a black patch on a cyan patch, and overlapping a black patch on a magenta patch has been proposed. Such overlapping patches consume a larger amount of toner. When the amount of toner is decreased, it becomes difficult to stably detect the toner patch. As described above, the prior art has conflicting problems.

SUMMARY OF THE INVENTION

The disclosure provides an image forming apparatus comprising: a plurality of image forming units each having: an image carrier, an exposure unit configured to form an electrostatic latent image by exposing a surface of the image carrier, and a developing unit configured to form a toner image by developing, by toner, the electrostatic latent image formed on the surface of the image carrier by the exposure unit; an intermediate transfer member on which a plurality of toner images of different colors are transferred from the plurality of image forming units; a sensor configured to detect a correction pattern in order to correct a positional shift of an image formed on the intermediate transfer member; and a controller configured to control the plurality of image forming units based on a detection result of the sensor, wherein the sensor includes a light emitting element configured to irradiate the intermediate transfer member with light, and a light receiving element configured to receive light reflected by either the intermediate transfer member or the correction pattern among the light outputted from the light emitting element, and the correction pattern includes an overlapping pattern on which a first monochromatic toner image is formed as a lower layer and a second monochromatic toner image having a smaller area than the first monochromatic toner image is formed as an upper layer, wherein the controller controls the plurality of image forming units to form the overlapping pattern such that a dynamic range D, which is calculated from a first received light amount $V1$ obtained by the light receiving element receiving light reflected from the first monochromatic toner image, a second received light amount $V2$ obtained by the light receiving element receiving light reflected from the second monochromatic toner image, a received light amount $V1'$ of a case where a tone value of the first monochromatic toner image is 100%, and a received light amount $V2'$ of a case where a tone value of the second monochromatic toner image is 100%, becomes less than 1.0 and larger than 0.5, where $D=(V1-V2)/(V1'-V2')$.

Further features of the present invention will become apparent from the following description of exemplary embodiments (with reference to the attached drawings).

BRIEF DESCRIPTION OF THE DRAWINGS

FIGS. 9A to 9C comprise a table showing parameters and performance regarding each embodiment and comparative example.

FIG. 21 is table for describing a relationship between an exposure area tone value and ghosting.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be

1. Image Forming Apparatus

Figure 1:
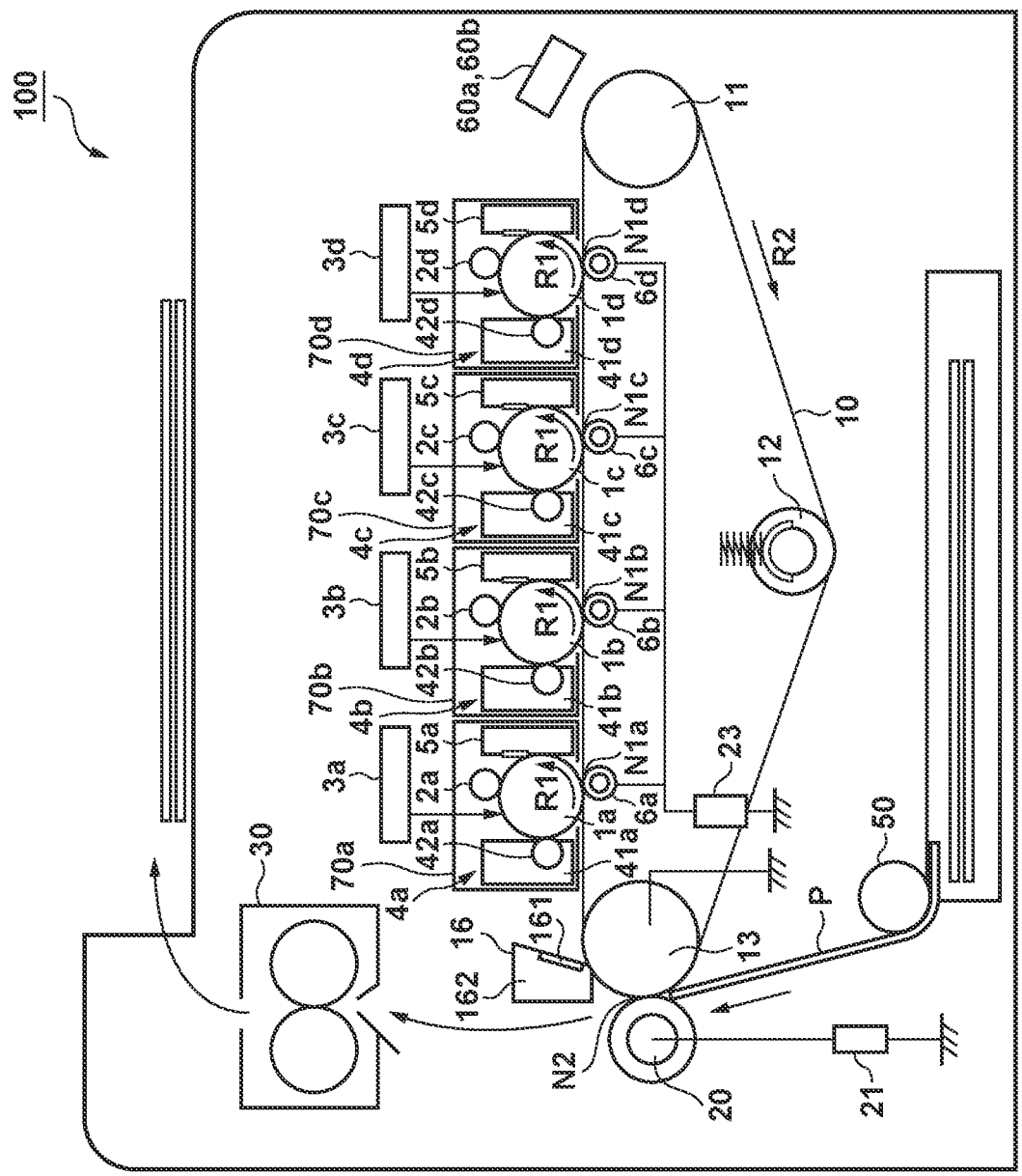
FIG. 1 is a view for describing an image forming apparatus.

As illustrated in FIG. 1, an image forming apparatus 100 is a printer that forms a toner image on a sheet P by executing an electrophotographic process. The image forming apparatus 100 is a so-called tandem type image forming apparatus having four image forming units 70a to 70d. The image forming unit 70a forms a yellow "Y" toner image. The image forming unit 70b forms a magenta "M" toner image. The image forming unit 70c forms a cyan "C" toner image. The image forming unit 70d forms a black "Bk" toner image. The image forming units 70a to 70d are arranged at a fixed distance, and many portions of the image forming units 70a to 70d are substantially the same as each other except for the color of the toner. Hereinafter, the image forming unit 70a will be representatively described, but the description can also be applied to the image forming units 70b to 70d. Also, the letters a to d appended to the end of the reference numerals are omitted when matters common to the four colors are described.

The image forming units 70a to 70d each have a photosensitive drum 1, a charging roller 2, a developer 4, and a drum cleaner 5. The photosensitive drum 1 is a drum-shaped photosensitive element and an image carrier that carries a toner image, and is rotationally driven at a predetermined process speed (e.g., 200 mm/sec) in a direction indicated by an arrow R1. Note that the image forming units 70a to 70d may be understood to also include an exposure apparatus 3.

The developer 4 has a developing container 41 that contains toner, and a developing roller 42. The developing roller 42 is a developing member that carries the toner contained in the developing container 41 and develops a toner image on the photosensitive drum 1. The drum cleaner 5 collects the toner adhering to the photosensitive drum 1. The drum cleaner 5 has a cleaning blade that contacts the photosensitive drum 1, and a toner box that contains toner or the like removed from the photosensitive drum 1 by the cleaning blade.

When an image forming operation is started, the photosensitive drum 1 is rotationally driven. The charging roller 2 uniformly charges the surface of the photosensitive drum 1 so that the surface of the photosensitive drum 1 has a predetermined polarity (e.g., negative polarity) and a predetermined potential (dark portion potential Vd).

The exposure apparatus 3 exposes the surface of the image carrier to form an electrostatic latent image by irradiating the surface with light. For example, an exposure apparatus 3a outputs light in accordance with a corresponding image signal of a yellow image, and forms an electrostatic latent image on the surface of a rotating photosensitive drum 1a. The developing roller 42 causes toner to adhere to the surface of the rotating photosensitive drum 1 to form a toner image. By this, an electrostatic latent image is visualized. The developing roller 42 rotates at 300 mm/sec, for example. The normal charging polarity of the toner contained in the developer 4 is negative. In this embodiment, an electrostatic latent image is reversely developed by toner charged to the same polarity as the charging polarity of the photosensitive drum 1 by the charging roller 2. For example, a −1000 V charging voltage is applied to the charging roller 2. As a result, the surface potential of the photosensitive drum 1 becomes −600 V, for example. The surface potential of an area exposed by the exposure apparatus 3 is, for example, −200 V. The developing voltage applied to the developing roller 42 is, for example, −350 V. These are merely examples, and configuration may be taken such that an electrostatic latent image is positively developed by the toner charged to a polarity opposite to the charging polarity of the photosensitive drum 1. Control parameters such as a charging voltage, an exposure amount, and a developing voltage are adjusted so that the amount of toner adhering to the photosensitive drum 1 is at most 0.40 g/cm² for any color.

An intermediate transfer belt 10 is an endless rotatable intermediate transfer member. The intermediate transfer belt 10 is arranged so as to abut the photosensitive drums 1a to 1d. The intermediate transfer belt 10 is stretched by a support roller 11, a stretching roller 12, and an opposing roller 13 which are stretching members. The intermediate transfer belt 10 is driven by the opposing roller 13 that rotates in response to a driving force, and rotates in a direction indicated by an arrow R2. The volume resistivity of the intermediate transfer belt 10 is, for example, $1 \times 10^{10}$ Ω·cm.

The toner images formed on the photosensitive drum 1 pass through a primary transfer nip N1 where the photosensitive drum 1 contacts the intermediate transfer belt 10. At this time, the primary transfer power supply 23 applies a positive polarity voltage (e.g., 500 V) to a primary transfer roller 6. As a result, the toner image is transferred from the photosensitive drum 1 to the intermediate transfer belt 10. Thereafter, the drum cleaner 5a collects toner remaining on the photosensitive drum 1a that has not been transferred to the intermediate transfer belt 10.

The primary transfer roller 6 is arranged at a position facing the photosensitive drum 1 via the intermediate transfer belt 10. The primary transfer roller 6 is a primary transfer member (contact member) in contact with the inner peripheral surface of the intermediate transfer belt 10. A primary transfer power supply 23 is a power supply circuit capable of applying a voltage of a positive polarity or a negative polarity to the primary transfer rollers 6a to 6d. In the present embodiment, the common primary transfer power supply 23 applies a transfer voltage to the plurality of primary transfer members, but this is merely an example. For example, one primary transfer power supply may be provided for one primary transfer member.

By executing such a procedure, a yellow toner image as a first color, a magenta toner image as a second color, a cyan toner image as a third color, and a black toner image as a fourth color are formed on the intermediate transfer belt 10. Further, a full-color image is realized by changing the density (tone) of the toner images of respectively different colors and changing a combination of the toner images to be overlapped.

The four-color toner image carried on the intermediate transfer belt 10 passes through a secondary transfer nip N2 formed by contact between a secondary transfer roller 20 and the intermediate transfer belt 10. At the secondary transfer nip N2, the four-color toner image is collectively transferred onto the surface of a sheet P, which is a sheet or an overhead projection (OHP) film, etc., fed and conveyed from a feeding device 50. The sheet P may be referred to as a transfer material or a printing material.

The secondary transfer roller 20 is arranged so as to be in contact with the outer peripheral surface of the intermediate transfer belt 10. The opposing roller 13 is arranged at a position facing the secondary transfer roller 20 via the intermediate transfer belt 10. The secondary transfer roller 20 is pressed against the opposing roller 13 by a 50 N pressing force, forming the secondary transfer nip N2.

The secondary transfer roller 20 is driven to rotate against the intermediate transfer belt 10. When the transfer voltage is applied from a secondary transfer power supply 21 to the secondary transfer roller 20, a transfer current flows from the secondary transfer roller 20 toward the opposing roller 13. As a result, the toner image carried on the intermediate transfer belt 10 is secondarily transferred to the sheet P at the secondary transfer nip N2. Note, the secondary transfer power supply 21 controls the transfer voltage applied to the secondary transfer roller 20 so that the transfer current becomes fixed. The magnitude of the transfer current for performing the secondary transfer is determined in advance depending on the surrounding environment in which the image forming apparatus 100 is installed and the type of the sheet P. The secondary transfer power supply 21 is connected to the secondary transfer roller 20, and applies a transfer voltage to the secondary transfer roller 20. The secondary transfer power supply 21 can generate and output a transfer voltage ranging from 100 V to 4000 V, for example.

A fixing unit 30 heats and pressurizes the sheet P onto which the four-color toner image has been transferred. As a result, the four colors of toner are melted and mixed, and thereby affixed on the sheet P. Meanwhile, a belt cleaner 16 cleans and removes the toner remaining on the intermediate transfer belt 10 after the secondary transfer. The belt cleaner 16 has a cleaning blade 161 and a toner container 162. The cleaning blade 161 is an abutting member that abuts on the outer peripheral surface of the intermediate transfer belt 10 at a position opposing the opposing roller 13. The toner container 162 contains the toner collected by the cleaning blade 161.

Optical sensors 60a and 60b detect toner images formed on the intermediate transfer belt 10. For example, the optical sensors 60a and 60b detect a test image for color shift correction, a test image for an amount of density correction, and the like.

2. Controller

Figure 2:
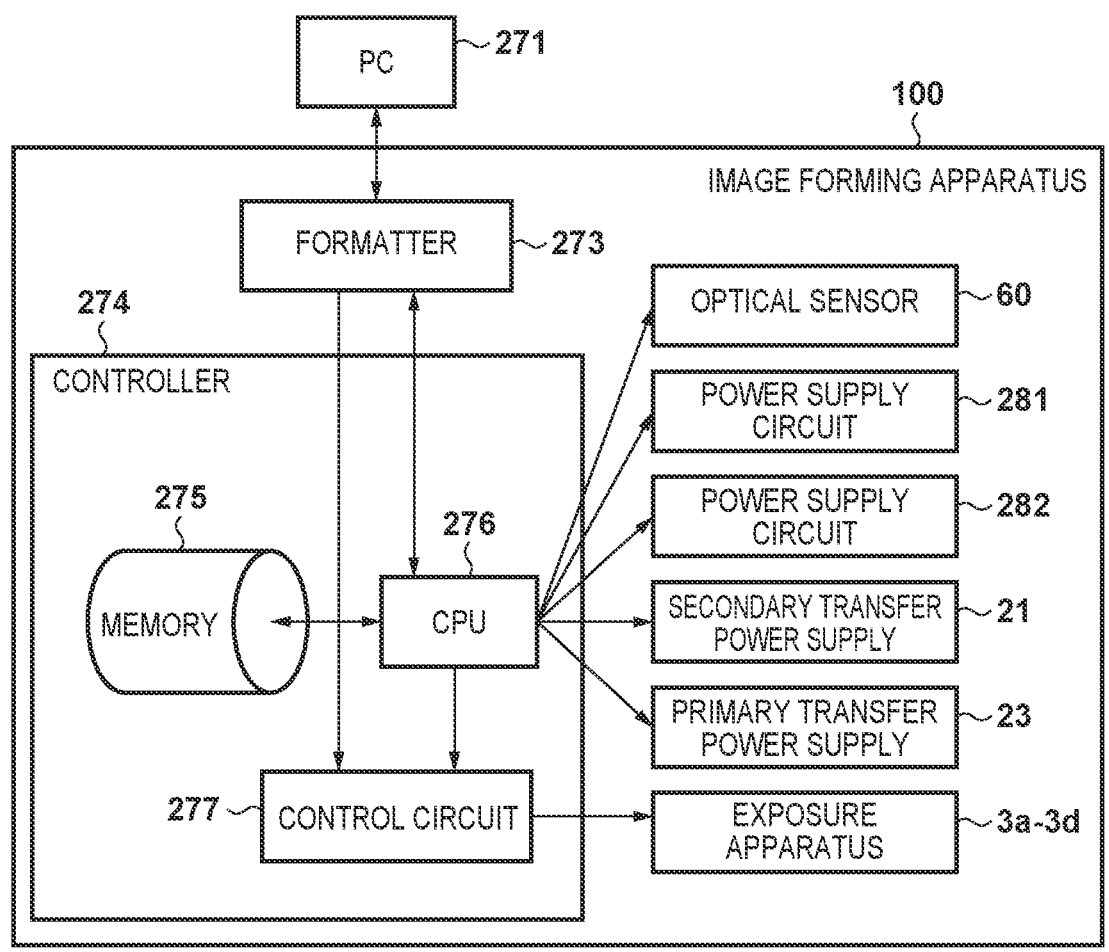
FIG. 2 is a view for describing a controller.

FIG. 2 is a block diagram of a controller that controls the image forming apparatus 100. A PC 271, which is a host computer, transmits print instructions and image data to a formatter 273 inside the image forming apparatus 100. The formatter 273 is a semiconductor integrated circuit such as an application specific integrated circuit (ASIC). The formatter 273 may be realized by a CPU 276. The formatter 273 converts RGB format or CMYK format image data received from the PC 271 into CMYK format exposure data in accordance with parameters specified from the PC 271. For example, the resolution of the exposure data is 600 dpi. The parameters specified by the PC 271 include the type of the sheet P (e.g., grammage and presence or absence of surface processing), the size of the sheet P, the mode related to image quality (e.g., the number of lines in the dither matrix), and the like. The formatter 273 transfers exposure data to a control circuit 277 within a controller 274. The control circuit 277 controls the exposure apparatus 3 in accordance with an instruction from the CPU 276. A halftone control is realized by adjusting an area to be exposure-on and an area to be exposure-off in the exposure data. The control circuit 277 may be realized by the CPU 276.

The controller 274 has the CPU 276, a memory 275, and the like. The CPU 276 realizes various functions by executing programs stored in a memory 275. In particular, the CPU 276 starts an image forming sequence when a print instruction is handed over by the formatter 273. The CPU 276 causes a charging voltage to be generated in a power supply circuit 281 and supplies the charging voltage to charging rollers 2a to 2d. The CPU 276 causes a developing voltage to be generated in a power supply circuit 282 and supplies the developing voltage to the developing rollers 42a to 42d. The CPU 276 causes a primary transfer voltage to be generated in the primary transfer power supply 23 and supplies the primary transfer voltage to the primary transfer rollers 6a to 6d. The CPU 276 causes a secondary transfer voltage to be generated in the secondary transfer power supply 21 and supplies the secondary transfer voltage to the secondary transfer roller 20.

The CPU 276 corrects a shift in the transfer position between images of different colors formed in the image forming apparatus 100. This is referred to as a color shift correction. The CPU 276 causes the optical sensors 60a and 60b to detect a test image formed on the intermediate transfer belt 10, and adjusts the exposure timing of the exposure apparatuses 3a to 3d based on the detection result so that a color shift is decreased.

The level of the detection signal by the optical sensors 60a and 60b is, for example, 0 V to 3.3 V. The CPU 276 calculates a shift amount between colors by using the detection results of the optical sensors 60a and 60b, and corrects the color shift according to the shift amount. Note, the color shift correction has a step of measuring the amount of color shift, a step of determining a correction value of the exposure timing from the measurement result, and a step of applying the correction value to the exposure timing.

The CPU 276 may cause the optical sensors 60a and 60b to detect a test image for density correction, and then execute density correction (tone correction) of a toner image based on the detection result. Specifically, a tone correction table for correcting image data is created so that the tone characteristics of the input image and the tone characteristics of the output image match each other. The formatter 273 corrects the image data based on the tone correction table.

3. Optical Sensor

Figure 3A:
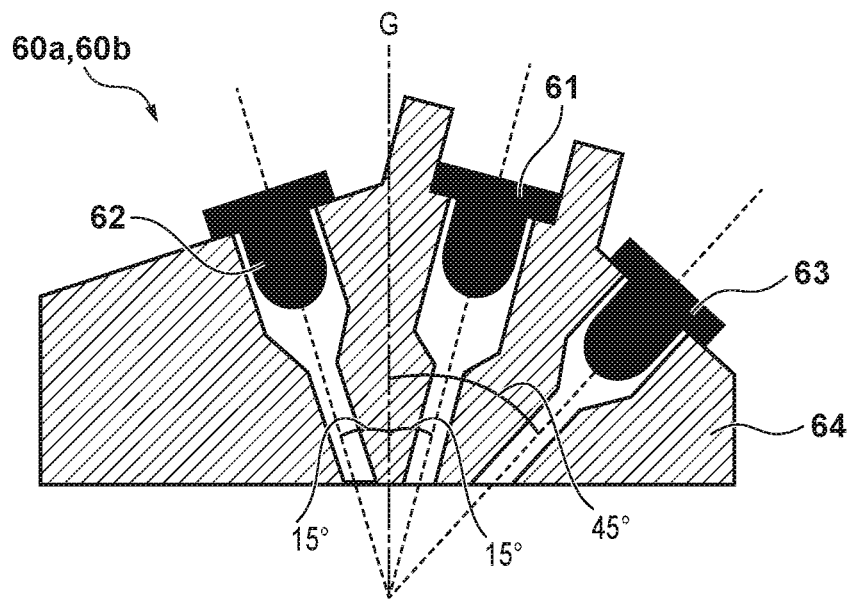
FIGS. 3A and 3B are views for describing optical sensors.
Figure 3B:
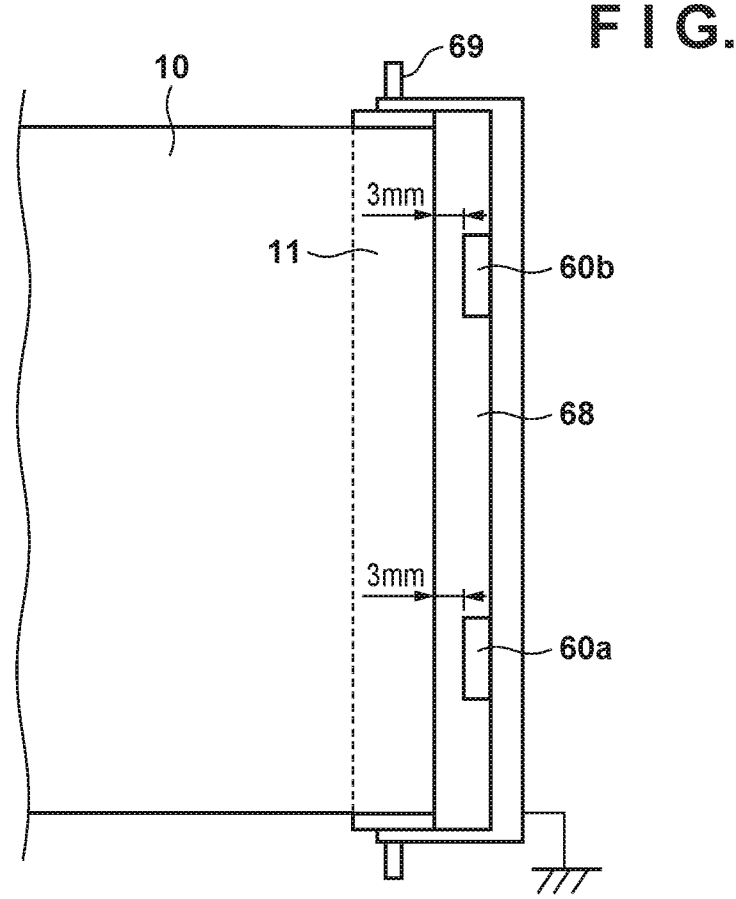

FIG. 3A illustrates an internal structure of the optical sensors 60a and 60b. FIG. 3B illustrates a support structure of the optical sensors 60a and 60b. The optical sensors 60a and 60b are arranged so as to face the front face of the intermediate transfer belt 10, and are held by a holding member 68 which is a grounded metal plate. The optical sensor 60a is provided near one end in the widthwise direction of the intermediate transfer belt 10. The optical sensor 60b is provided near another end in the widthwise direction of the intermediate transfer belt 10. The one end and the other end of the holding member 68 are attached to a rotation shaft 69 of the support roller 11. The distance from the optical sensors 60a and 60b to the front surface of the intermediate transfer belt 10 is, for example, 3 mm.

The optical sensors 60a and 60b have a light emitting element 61 such as a light-emitting diode (LED), light receiving elements 62 and 63 such as phototransistors, and a holder 64. Infrared light is outputted from the light emitting element 61. The light receiving elements 62 and 63 receive light (reflected light) reflected by the base of the intermediate transfer belt 10 or a test image formed on the intermediate transfer belt 10, and output a detection signal having a level corresponding to the amount of received light. The peak light emission wavelength of the light emitting element 61 is, for example, 800 nm. The light receiving elements 62 and 63 are designed so that the light reception sensitivity of the light receiving elements 62 and 63 peaks at 800 nm.

The light emitting element 61 is supported by the holder 64 such that the optical axis of the light emitting element 61 has an inclination of, for example, 15° with respect to the normal direction G of the intermediate transfer belt 10. The light outputted from the light emitting element 61 forms a spot on the intermediate transfer belt 10. Here, the shape of the holder 64 is adjusted such that the spot diameter is 2 mm, for example. The light receiving element 62 is supported by the holder 64 such that the optical axis of the light receiving element 62 has an inclination of 15° with respect to the normal direction G of the intermediate transfer belt 10. The light receiving element 62 receives specular reflected light and diffuse reflected light from the test image and the surface (base) of the intermediate transfer belt 10. The light receiving element 63 is supported by the holder 64 such that the optical axis of the light receiving element 63 has an inclination of 45° with respect to the normal direction G of the intermediate transfer belt 10. The light receiving element 63 receives diffuse reflected light from the test image and the surface (base) of the intermediate transfer belt 10.

4. Detection of a Test Image by Optical Sensors (1) Detection Result of a Monochromatic Toner Pattern (Monochromatic Pattern)

Figure 4:
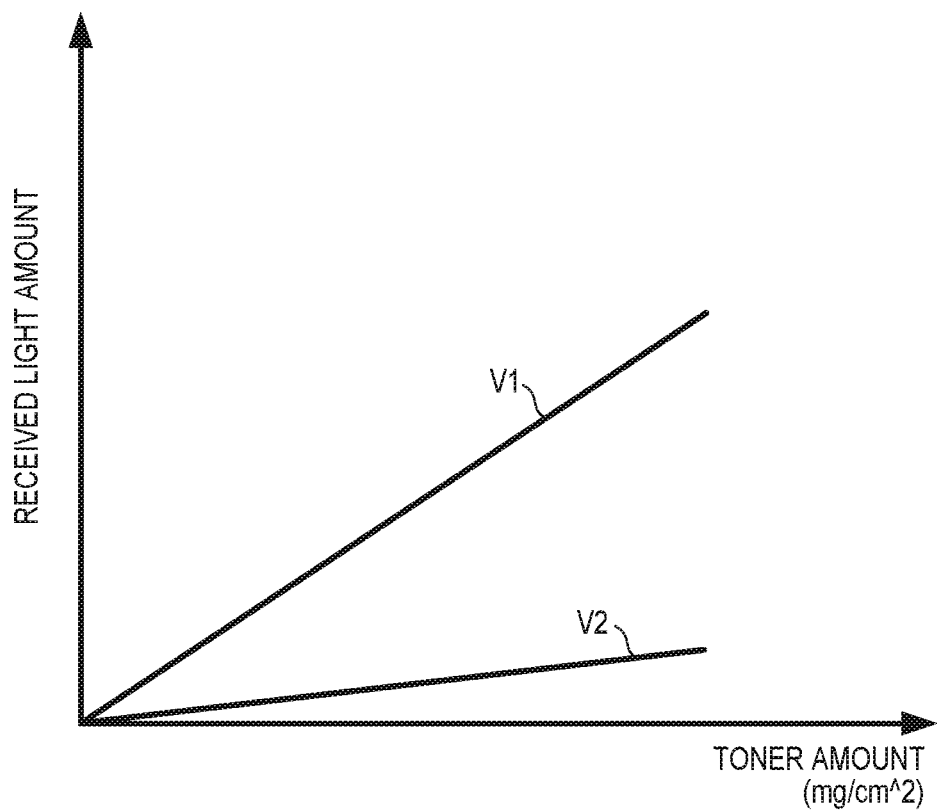
FIG. 4 is a view illustrating a relationship between an amount of toner and an amount of light received.

Here, a case where the light receiving element 63 detects a test image will be described. FIG. 4 shows a result of detecting a toner pattern that is a part of a test image. The horizontal axis represents the amount of toner (mg/cm$^2$) of the toner pattern. The vertical axis represents the detection result (received light amount) of the light receiving element 63.

V1 indicates a detection result of the yellow pattern. V2 indicates a detection result of the black pattern. The amount of received light increases in proportion to the amount of toner in both the detection result of the yellow pattern and the detection result of the black pattern. This is because the diffuse reflected light from the toner increases as the amount of toner increases. Meanwhile, the inclination of the black pattern is smaller than the inclination of the yellow pattern. The black pattern absorbs much of the irradiation light outputted from the light emitting element 61. For this reason, the diffuse reflected light becomes less. Note, the tendencies of the magenta pattern and the tendencies of the cyan pattern are almost the same as the tendencies of the yellow pattern.

Figure 5A:
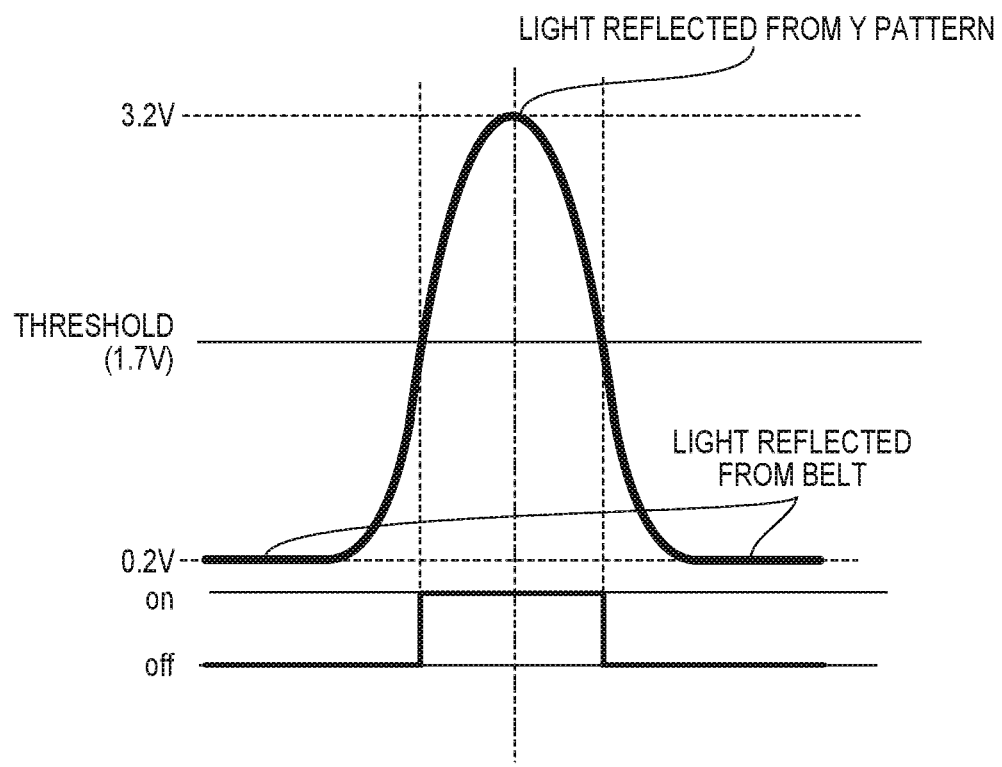
FIGS. 5A and 5B are views for describing a detection waveform of a monochromatic pattern.

FIG. 5A illustrates a detection waveform of a toner pattern (a yellow pattern having a tone value of 100%) obtained by the light receiving element 63 when the toner pattern formed on the intermediate transfer belt 10 passes through the optical sensor 60. That is, it is a detection waveform of a yellow pattern in which the toner amount is 0.40 mg/cm$^2$. Most of the light reflected from the intermediate transfer belt 10 is specular reflected light. Therefore, the light receiving element 63 does not detect most of the light reflected from the intermediate transfer belt 10. Meanwhile, the light receiving element 63 receives diffuse reflected light from the yellow pattern. Therefore, a peak detection waveform can be obtained at a timing when detecting the light reflected from the yellow pattern. Here, when the yellow pattern of 0.40 mg/cm$^2$ is detected, the amount of light irradiated from the light emitting element 61 is adjusted so that the output of the light receiving element 63 becomes 3.2V. When the optical sensor 60 detects the intermediate transfer belt 10, the output is 0.2V.

Figure 5B:
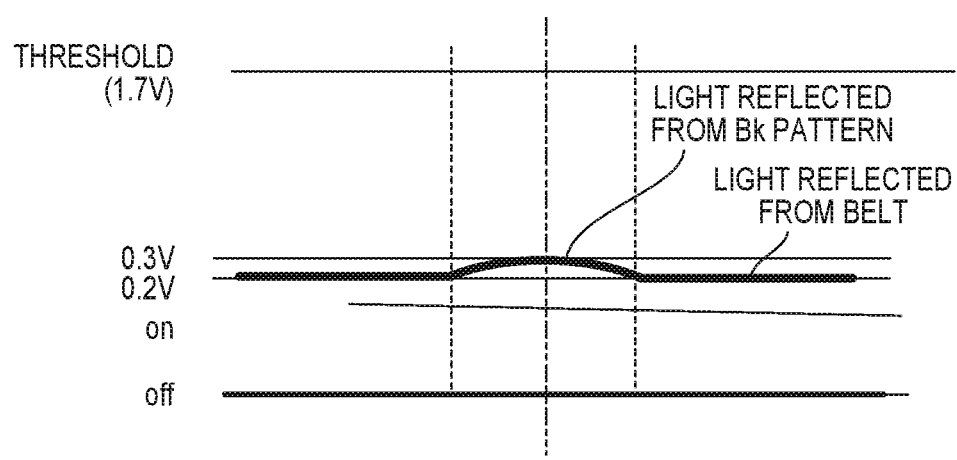

FIG. 5B illustrates a detection waveform of a toner pattern (a black pattern having a tone value of 100%) obtained by the light receiving element 63 when the toner pattern formed on the intermediate transfer belt 10 passes through the optical sensor 60. The toner amount of the black pattern is 0.40 mg/cm$^2$. The black pattern absorbs much of the irradiation light from the light emitting element 61. Therefore, when the optical sensor 60 detects the black pattern, the output is 0.3V.

The detection result of the light reflected from the toner pattern and the intermediate transfer belt 10 is processed by the controller 274. The detection signal of the received light amount of the optical sensor 60 is A/D (analog/digital) converted by the CPU 276 and is then inputted to the CPU 276. That is, the CPU 276 has an input port with an A/D converter. Note, the A/D converter may be provided external to the CPU 276. Here, 1.7V which is the midpoint between 3.2V which is the detection result of the yellow pattern and 0.2V which is the detection result of the intermediate transfer belt 10 is utilized as a digital-conversion reference (threshold). The A/D converter outputs High when the detection result exceeds a threshold, and outputs Low when the detection result does not exceed the threshold. The CPU 276 determines the midpoint of the timing at which the output of the A/D converter changes from High to Low and from Low to High. The CPU 276 recognizes this midpoint as a timing at which the center of gravity of the toner pattern passes through. In the example of FIG. 5A and FIG. 5B, it is illustrated that the center of gravity of the yellow pattern is detectable, but the center of gravity of the black pattern is not detectable.

(2) Detection Result of the Overlapping Toner Pattern

The overlapping toner pattern (overlapping pattern) is a pattern formed by overlapping two toner patterns each having different colors onto the intermediate transfer belt 10. The area of a toner pattern of the lower layer is larger than the area of a toner pattern of the upper layer. Also, when the overlapping pattern is viewed from above, a part of the toner pattern of the lower layer protrudes from both sides of the toner pattern of the upper layer. Hereinafter, a detection waveform of an overlapping pattern formed by a yellow toner pattern and a black toner pattern will be described as an example. The CPU 276 detects the black pattern by focusing on the difference between the amount of diffuse reflected light of the yellow pattern and the amount of diffuse reflected light of the black pattern.

Figure 6A:
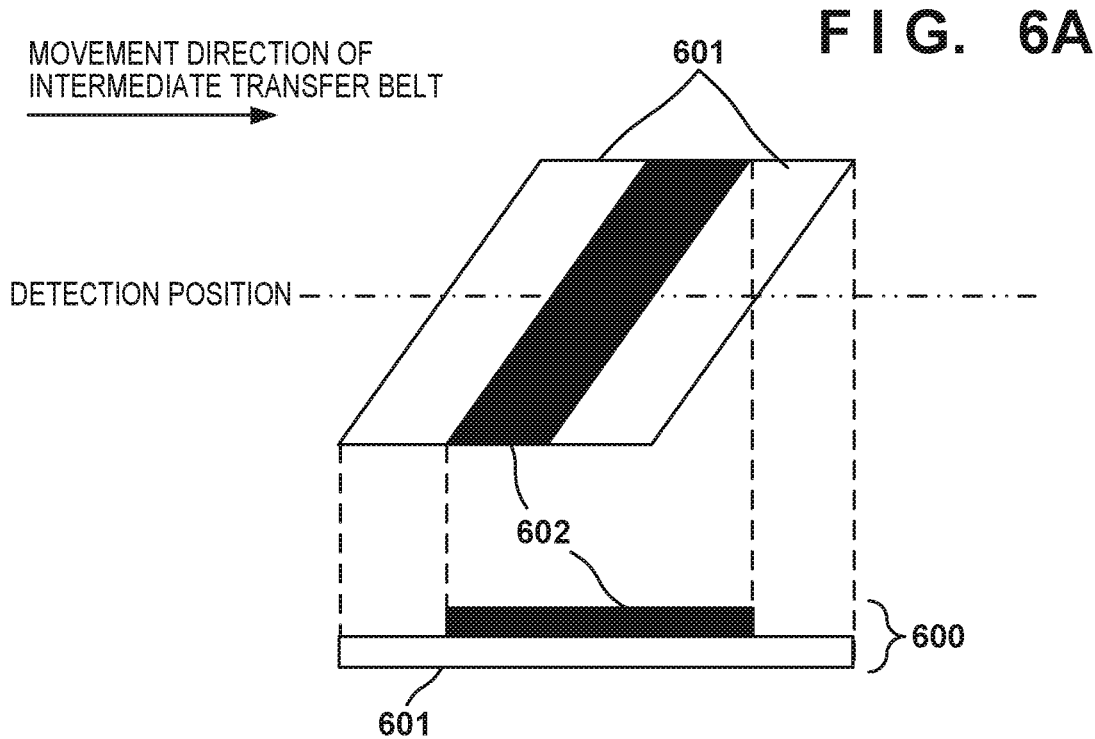
FIGS. 6A and 6B are views for describing a shape and a detection waveform of an overlapping pattern.

FIG. 6A includes a plan view and a side view of an overlapping pattern 600. A black pattern 602 overlaps a yellow pattern 601. The tone value of the yellow pattern 601 and the tone value of the black pattern 602 are 100%, respectively.

Figure 6B:
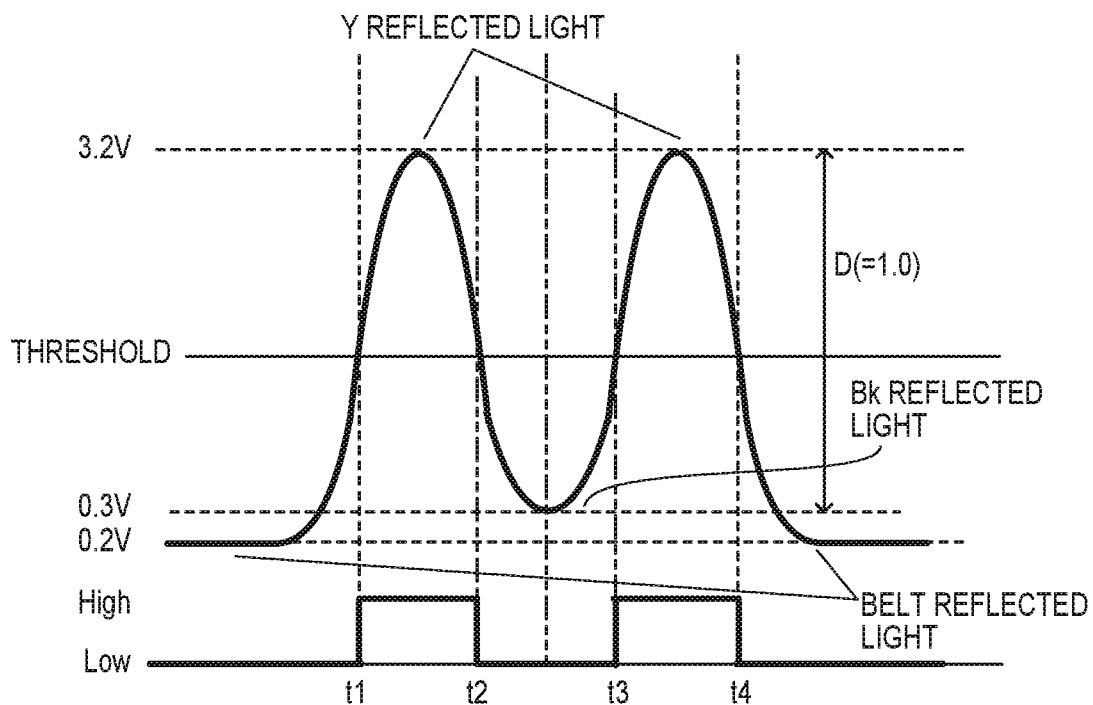

FIG. 6B shows the detection waveform of the overlapping pattern 600 detected by the light receiving element 63. Since the diffuse reflected light increases at a timing when the yellow pattern 601 passes through the optical sensor 60, the detection waveform rises and the output of the optical sensor 60 becomes 3.2V. At a timing when the black pattern 602 overlapping the yellow pattern 601 passes through the optical sensor 60, diffuse reflected light from the black pattern 602 is detected. The diffuse reflected light from the black pattern 602 is less than the diffuse reflected light from the yellow pattern 601. Therefore, the detection waveform falls and the output of the optical sensor 60 becomes 0.3V. Here, a dynamic range D that is a difference between a detection result V1 of the yellow pattern 601 and a detection result V2 of the black pattern 602 is defined.

$$D=(V1-V2)/(V1'-V2') \quad (1)$$

Here, V1' is a detection result of the yellow pattern 601 having a tone value of 100%. Here, V2' is a detection result of the black pattern 602 having a tone value of 100%. Note that in the case of FIG. 6B, since the tone value of the yellow pattern 601 and the tone value of the black pattern 602 are 100%, D=1.

As illustrated in FIG. 6B, the detection waveform of the overlapping pattern 600 has two peaks. Further, the detection result crosses the threshold four times in total. t1 is a timing at which the leading edge of the yellow pattern 601 is detected. t2 is a timing at which the leading edge of the black pattern 602 is detected. t3 is a timing at which the trailing edge of the black pattern 602 is detected. t4 is a timing at which the trailing edge of the yellow pattern 601 is detected. The center of gravity ty between t1 and t4 is the center of gravity of the yellow pattern 601. The center of gravity tk between t2 and t3 is the center of gravity of the black pattern 602. The CPU 276 calculates a color shift amount based on the center of gravity information (ty, tk). For example, if ty=tk, the color shift between black and yellow is zero.

In order to detect the edge of the yellow pattern 601 and the edge of the black pattern 602 in the overlapping pattern 600, it is sufficient that the dynamic range D be ensured such that the detection results cross a threshold. The tone value of each pattern need not be 100%. That is, there is a possibility that the amount of toner used can be decreased.

Since the overlapping pattern 600 is larger than an independent monochromatic toner pattern, the overlapping pattern 600 consumes more toner. Therefore, the ratio of the toner of the overlapping pattern 600 remaining on the photosensitive drum 1 is larger than that of the monochromatic pattern. That is, in the overlapping pattern 600, there may be wasteful toner that does not contribute to the pattern detection.

5. Color Shift Correction (1) Test Image

Figure 7:
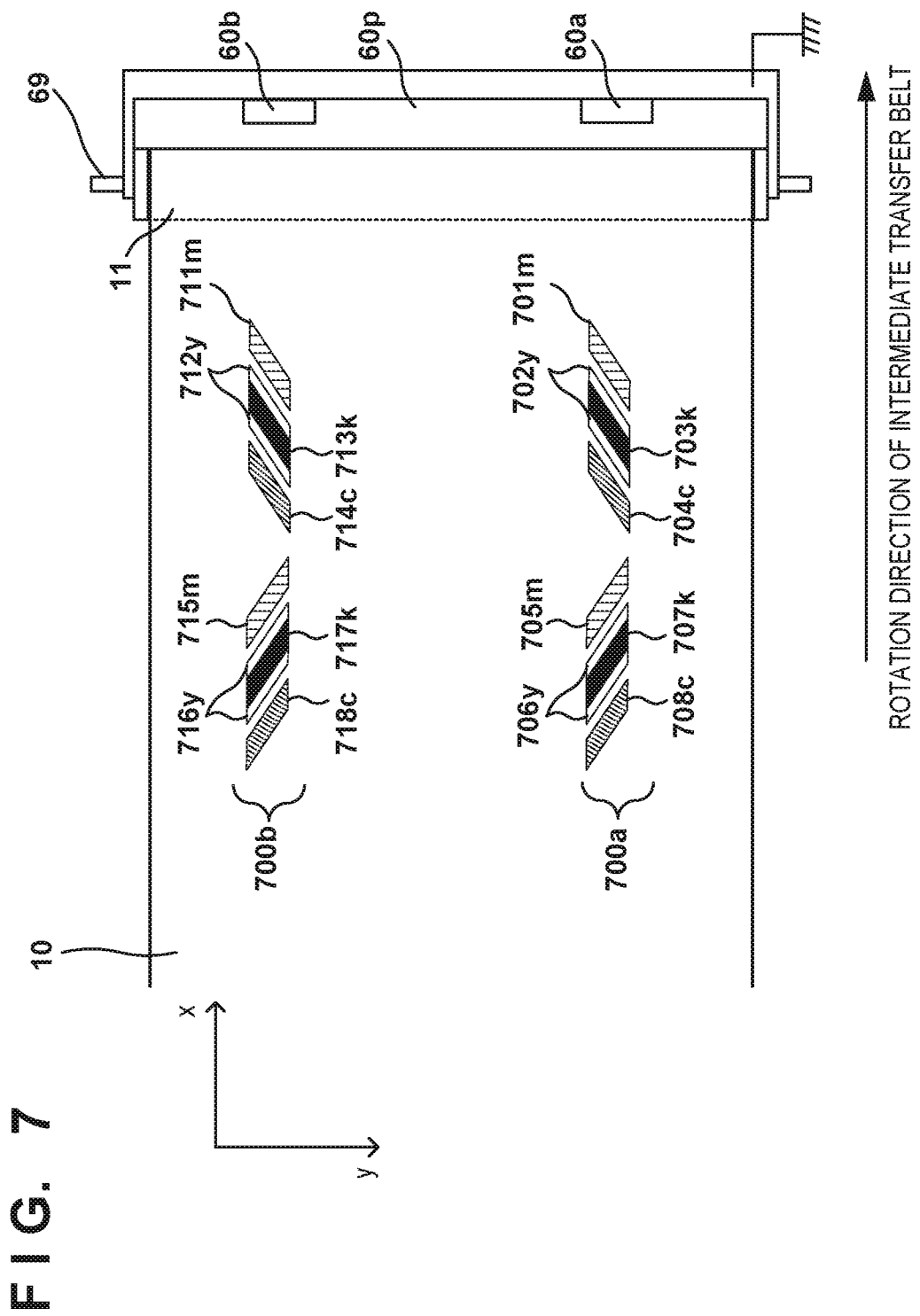
FIG. 7 is a view for describing a test image for color shift correction.

FIG. 7 illustrates a positional relationship between test images 700a and 700b for color shift correction and the optical sensor 60. x represents the sub-scanning direction, which is parallel to the rotation direction of the intermediate transfer belt 10. y represents the main scanning direction. By forming the test images 700a and 700b in the vicinity of both ends of the intermediate transfer belt 10, a color shift in the sub-scanning direction and a color shift in the main scanning direction are accurately corrected. Note that even if one of the test images 700a and 700b is omitted, a color shift correction can be executed.

Each of the test images 700 and 700b has a magenta monochromatic pattern, a cyan monochromatic pattern, and an overlapping pattern of yellow and black. 701m, 705m, 711m and 715m are magenta monochromatic patterns. 704c, 708c, 714c, and 718c are cyan monochromatic patterns. 702y, 706y, 712y, and 716y are yellow monochromatic patterns. 703k, 707k, 713k, and 717k are black monochromatic patterns. The test image 700a is detected by the optical sensor 60a. The test image 700b is detected by the optical sensor 60b. The number of each pattern can be set as appropriate.

Figure 8A:
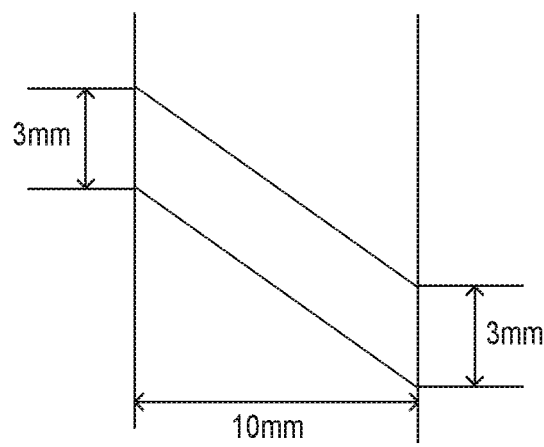
FIGS. 8A and 8B are views for describing a size of a toner pattern included in a test image.

FIG. 8A illustrates the size of a magenta monochromatic pattern and the size of a cyan monochromatic pattern. The width in the main scanning direction is, for example, 10 mm. The width in the sub-scanning direction is, for example, 3 mm.

Figure 8B:
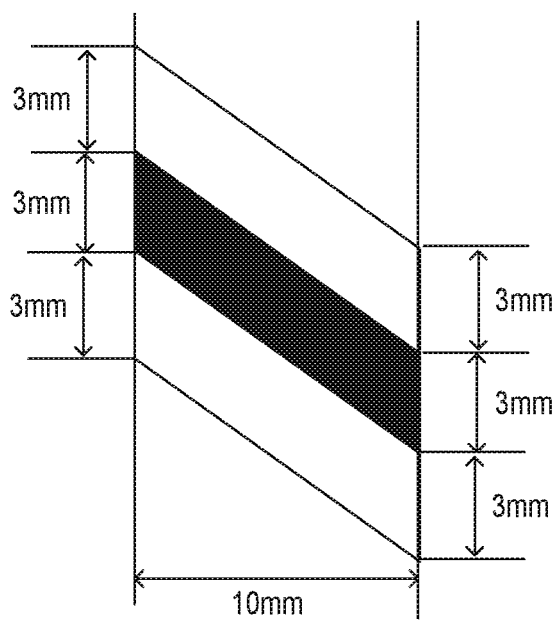

FIG. 8B shows the size of a yellow pattern and the size of a black pattern in the overlapping pattern. The width of the yellow pattern in the main scanning direction is, for example, 10 mm. The width of the yellow pattern in the sub-scanning direction is, for example, 9 mm. The width of the black pattern in the main scanning direction is, for example, 10 mm. The width of the black pattern in the sub-scanning direction is, for example, 3 mm. The center of the black pattern coincides with the center of the yellow pattern.

(2) Method for Obtaining a Color Shift Amount in a Sub-Scanning Direction from a Center of Gravity of a Pattern In the present embodiment, a color shift amount of each of magenta, cyan, and black (measurement target color) with respect to a yellow pattern (reference color) is obtained. Since the method of obtaining a color shift amount is common to magenta, cyan, and black, a method of calculating a color shift amount of the magenta pattern with respect to the yellow pattern will be described here.

In the test image 700b exemplified in FIG. 7, the center of gravity timing of a magenta pattern 711m is denoted as M1, and the center of gravity timing of a yellow pattern 712y is denoted as Y1. The center of gravity timing of a magenta pattern 715m is denoted as M2, and the center of gravity timing of a yellow pattern 716y is denoted as Y2. The CPU 276 calculates a shift amount rRpym in the sub-scanning direction using Equation (2), and calculates a shift amount rRsym in the main scanning direction using Equation (3).

$$rRpym=(Y1-M1)+(Y2-M2) \quad (2)$$

$$rRsym=(Y1-M1)-(Y2-M2) \quad (3)$$

Here, in a case where rRpym=0, (Y1−M1)=−(Y2−M2) is obtained. That is, the distance between the yellow pattern 712y and the magenta pattern 711m is equal to the distance between the yellow pattern 716y and the magenta pattern 715m. Therefore, no color shift occurs. In a case where rRpym>0, the magenta pattern is shifted in the +x direction in FIG. 7. In a case where rRpym<0, the magenta pattern is shifted in the −x direction. Therefore, the CPU 276 adjusts an image forming timing of magenta in accordance with the obtained rRpym value. As a result, a color shift in the sub-scanning direction is decreased.

In a case where rRsym=0, no color shift occurs in the main scanning direction. In a case where rRsym>0, the magenta pattern is shifted in the +y direction. In a case where rRsym<0, the magenta pattern is shifted in the −y direction. Therefore, the CPU 276 adjusts an image forming timing of magenta in accordance with the obtained rRsym value. As a result, a color shift in the main scanning direction is decreased.

In this way, in a color shift correction (registration correction), the edge of each color is detected by the detection result of the test image crossing a preset threshold. Also, the center of gravity of each color is calculated from the position of the edge, and the amount of color shift is obtained from the center of gravity of the reference color and the center of gravity of the measurement target color.

6. Exposure Amount Used for Forming an Overlapping Pattern

FIGS. 9A to 9C illustrate combinations of tone values for the yellow pattern and the black pattern constituting an overlapping pattern. Embodiments 1 to 10 are combinations in which it is possible to achieve both a decrease in consumption of toner in a test image and stable detection of the test image. Comparative examples 1 to 17 are combinations in which achieving both a decrease in consumption of toner in a test image and stable detection of a test image is difficult. As already explained, the dynamic range D is obtained from Equation (1).

FIGS. 9A to 9C, Y tone indicates the tone value of a yellow pattern. Y output indicates a detection result of the yellow pattern. Bk tone indicates the tone value of a black pattern. Bk output indicates a detection result of the black pattern. Y edge detection indicates whether the two edges of the yellow pattern have been detected. Bk edge detection indicates whether the two edges of the black pattern have been detected. Stability indicates whether the yellow pattern and the black pattern can be stably detected.

(1) Density Correction

Figure 10A:
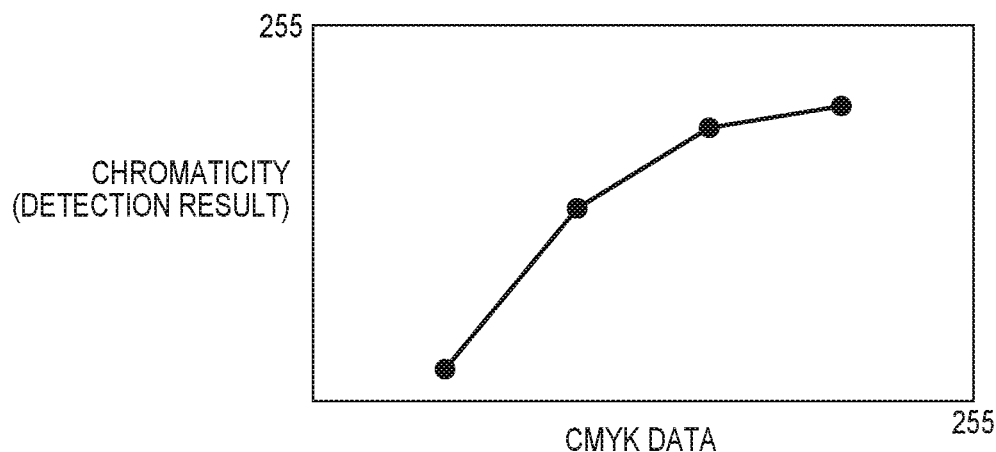
FIGS. 10A to 10C are views illustrating relationships between tone and chromaticity.

FIG. 10A shows detection results of a test image for density correction. The horizontal axis indicates data of one of the colors in CMYK data. These data are area tone values of the exposure amount, and are expressed by 256 tones (8 bits). The maximum value of the horizontal axis is 255. An image having an area tone value of 100% is referred to as a so-called solid image. The test image includes four test patterns having area tone values of 20%, 40%, 60%, and 80%, respectively. A known method for converting a net specular reflection component obtained from the amount of specular reflected light and the amount of diffuse reflected light into chromaticity is utilized as the method of detection of a test pattern. The vertical axis represents the chromaticity obtained from the net amount of specular reflected light. The calculation of the net amount of specular reflected light based on the detection result of the test pattern is executed by the CPU 276. The calculation result (tone correction table) is sent to the formatter 273. The formatter 273 corrects, based on the calculation result, the input image data to output image data corresponding to the CMYK data. This is referred to as gamma correction (tone correction).

Figure 10B:
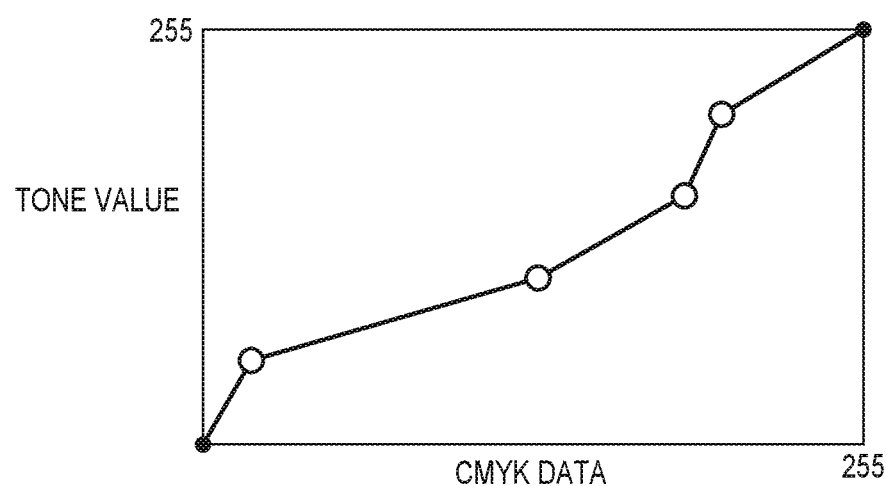
Figure 10C:
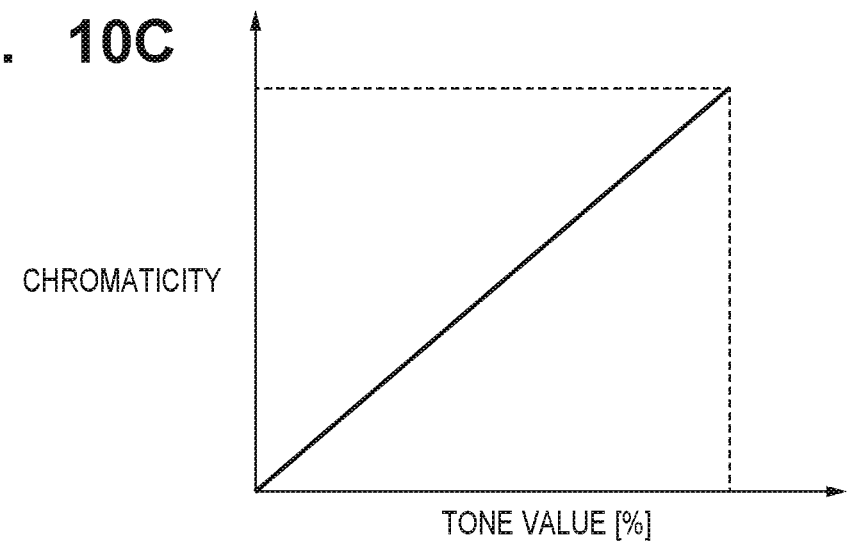

FIG. 10B is a view for describing a tone correction. The horizontal axis represents 256 tones of the CMYK data. The vertical axis represents the output image data. Since there are only four data of the test patterns, other data existing between these actual data are obtained by linear combination. In the example illustrated in FIG. 10B, at a point where the CMYK data is zero, the output image data is zero. At a point where the CMYK data is 255, the output image data is 255. The CPU 276 creates an inverse function correction table, such as FIG. 10B, for the detection results of the test patterns shown in the FIG. 10A. As a result, as shown in FIG. 10C, a chromaticity that is linear with respect to the tone value (%) is realized.

The formatter 273 forms a halftone of the black pattern using a dither pattern. A dither pattern is a pattern for adjusting the amount of toner by area modulating a pixel block (by modulating the dot size).

Figure 11:
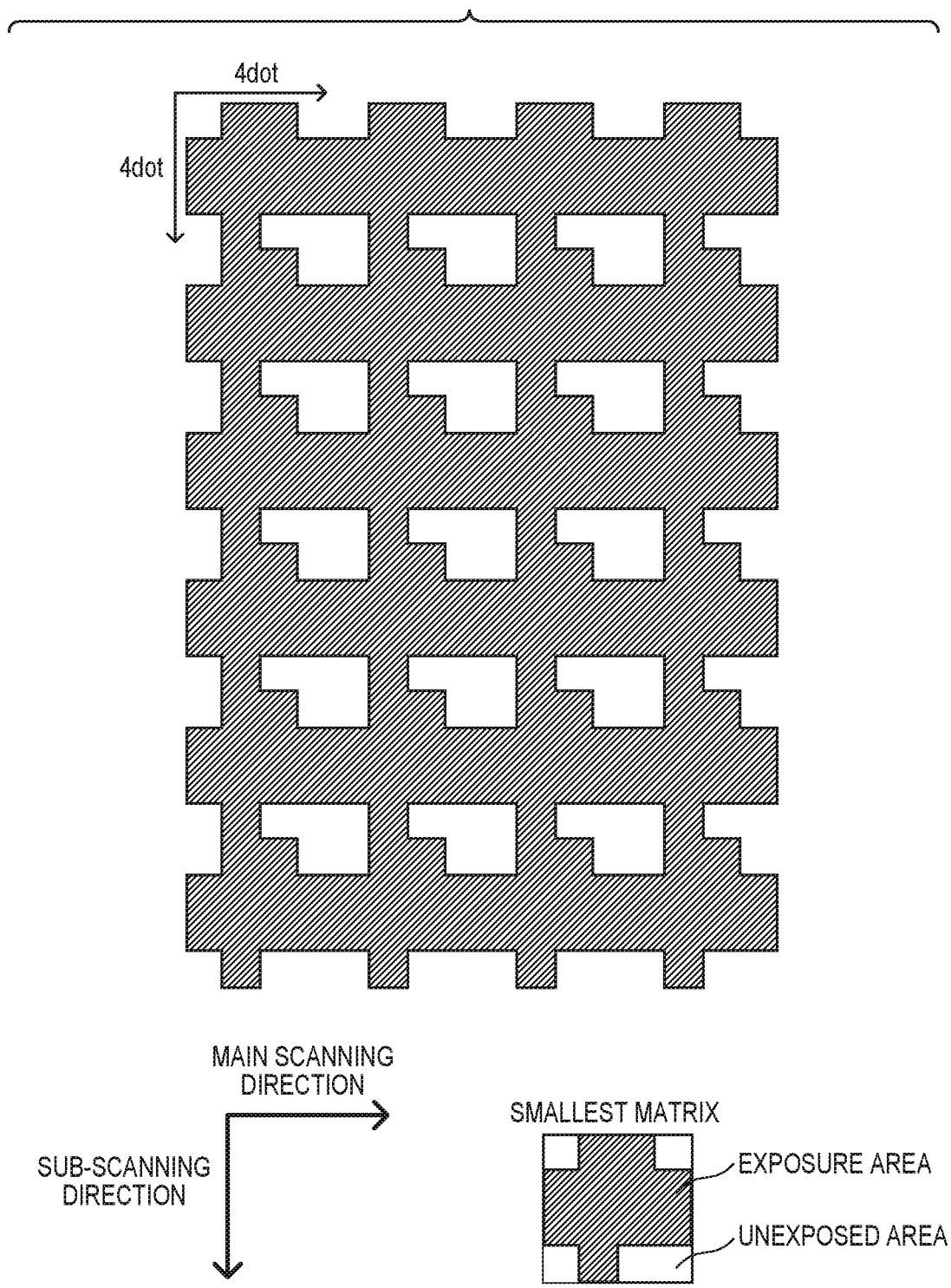
FIG. 11 is a view for describing a dither pattern.

FIG. 11 is a view illustrating adjustment of an area of an exposure area to form a black pattern. In FIG. 11, a plurality of exposure areas are periodic. A method of adjusting the amount of toner by periodically adjusting the area of an exposure area is referred to as a dither matrix method. A graphic constituting the smallest unit of a repetitive pattern is referred to as a dither matrix. In FIG. 11, a black portion represents an exposure area. Here, as an example, the exposure area of the dither matrix corresponds to 70% of the total area. The number of lines M of the dither matrix in the dither matrix method is expressed by Equation (4).

$$M = 600/N^{1/2} \tag{4}$$

Here, 600 represents a resolution [dpi]. Therefore, this numeric value is changed depending on the actual resolution. N is the number of matrices. The number of matrices N indicates the smallest size of the repetition. Since the number of matrices N represents the distance between the dot patterns, the units of the number of lines M are lines per inch (lpi).

Figure 12A:
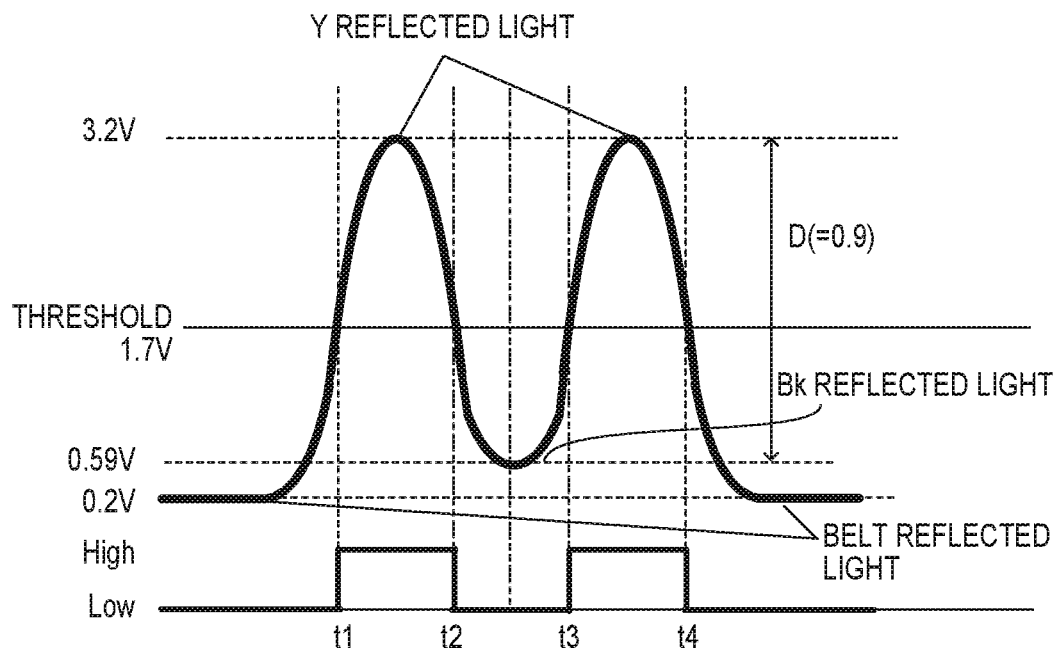
FIGS. 12A and 12B are views for describing a detection waveform of overlapping patterns of a first embodiment and a fourth embodiment.
Figure 12B:
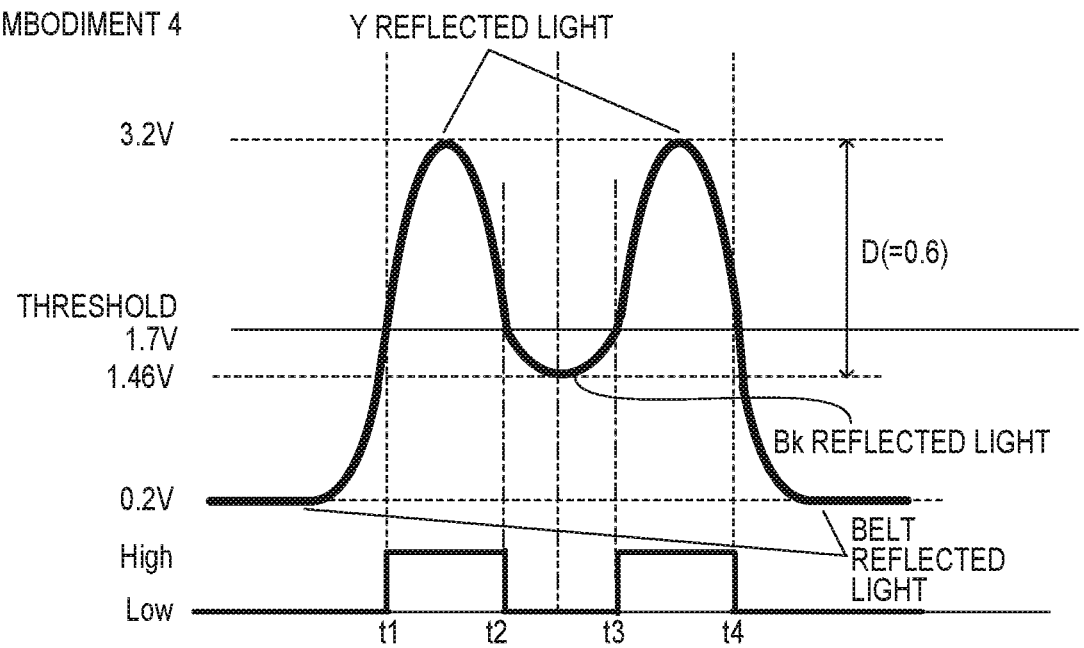

In the following, the features of the overlapping patterns of Embodiments 1 to 10 and the features of the overlapping patterns of Comparative Examples 1 to 17 will be described. All the tone values are output image data corrected by the correction table shown in FIG. 10B, and the units are %. In Embodiments 1 to 4, the tone value of the yellow pattern is 100%. The black pattern is formed by a halftone. As a representative of these embodiments, FIG. 12A illustrates a detection waveform of an overlapping pattern of the first embodiment. FIG. 12B illustrates a detection waveform of an overlapping pattern of the fourth embodiment.

The exposure area tone value is 70% in FIG. 12A and FIG. 12B. The interval between the dot patterns in the main scanning direction and the interval between the dot patterns in the sub-scanning direction are both four dots. Therefore, the number of matrices N is 16, and the number of lines M of the black pattern is 150 lpi.

As illustrated in FIGS. 9A to 9C, the first embodiment is an overlapping pattern in which the tone value of the yellow pattern is 100% (solid image) and the tone value of the black pattern is 90% (halftone). Since the tone value of the yellow pattern is 100%, the detection result of the yellow pattern is 3.2V. The tone value of the black pattern is 90%, and the chromaticity is 90%. When the chromaticity of the black pattern decreases, the amount of reflected light from the yellow pattern formed in the lower layer of the black pattern increases. As illustrated in FIG. 12A, the black pattern detection result is 0.59V. The dynamic range D is 0.9 which crosses the threshold 1.7V. Therefore, each edge of the yellow pattern and the black pattern can be detected.

In FIG. 12A, t1 and t4 indicate timings at which the edges of the yellow pattern are detected. Compared to FIG. 6B, the time from the timing t1 to the timing t4 is longer, but the center of gravity is substantially the same as the center of gravity obtained from FIG. 6B in FIG. 12A. t2 and t3 are times at which the edges of the black pattern are detected. The time from the timing t2 to t3 is shorter than when the tone value of the black pattern is 100%. Meanwhile, the center of gravity is substantially the same as the center of gravity obtained from FIG. 6B. Thus, the first embodiment achieves detection accuracy similar to the detection waveform shown in FIG. 6B.

The second embodiment is an overlapping pattern in which the tone value of the yellow pattern is 100% and the tone value of the black pattern is a halftone of 80%. The detection result of the yellow pattern is 3.2V. The detection result of the black pattern is 0.88V. The dynamic range D is 0.80, which crosses the threshold 1.7V. Therefore, each edge of the yellow pattern and the black pattern can be detected.

The third embodiment is an overlapping pattern in which the tone value of the yellow pattern is 100% and the tone value of the black pattern is a halftone of 70%. The detection result of the yellow pattern is 3.2V. The detection result of the black pattern is 1.17V. The dynamic range D is 0.70, which crosses the threshold 1.7V. Therefore, each edge of the yellow pattern and the black pattern can be detected.

The fourth embodiment is an overlapping pattern in which the tone value of the yellow pattern is 100% and the tone value of the black pattern is a halftone of 60%. The detection result of the yellow pattern is 3.2V. The detection result of the black pattern is 1.46V. The dynamic range D is 0.60, which crosses the threshold 1.7V. Therefore, each edge of the yellow pattern and the black pattern can be detected.

The black pattern shown in FIG. 12B has a small detection waveform and is approximately slightly below the threshold 1.7V. The time from t1 to t4, which is the timing for detecting the edge of the yellow pattern, is longer than that in FIG. 6B, but the center of gravity of t1 to t4 is substantially the same as the center of gravity obtained from FIG. 6B. The time from t2 to t3, which is the timing at which the edge of the black pattern is detected, is shorter than the time when the tone value of the black pattern is 100%. The center of gravity of t2 to t3 is substantially the same as the center of gravity obtained from FIG. 6B. The fourth embodiment achieves detection accuracy similar to the detection waveform shown in FIG. 6B.

Figure 13A:
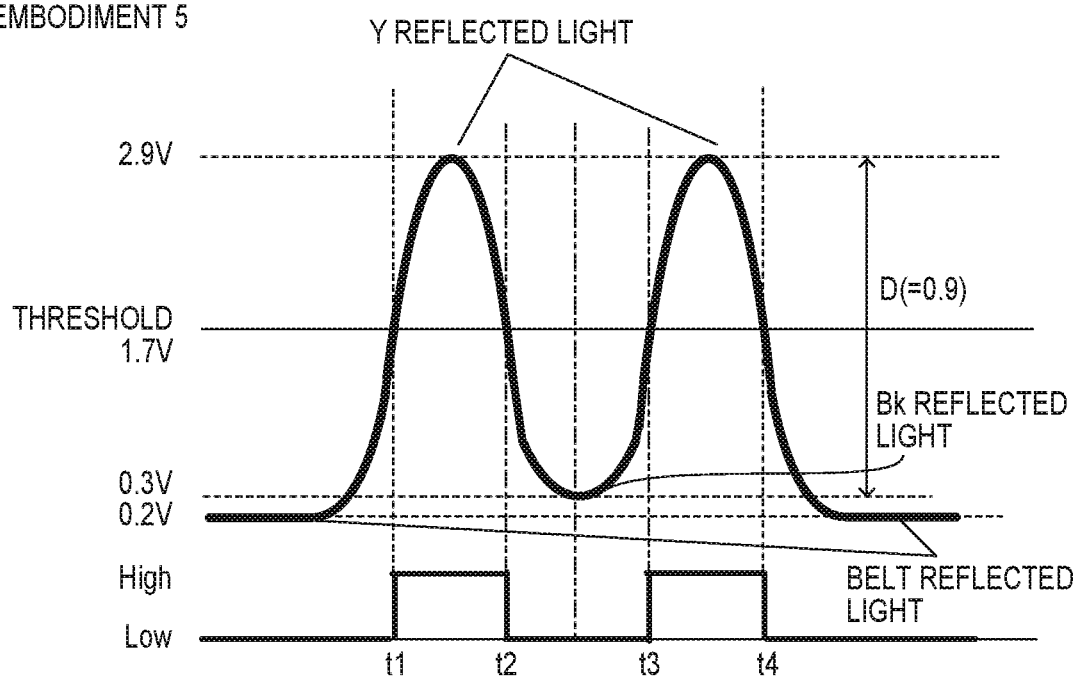
FIGS. 13A and 13B are views for describing a detection waveform of overlapping patterns of a fifth embodiment and an eighth embodiment.
Figure 13B:
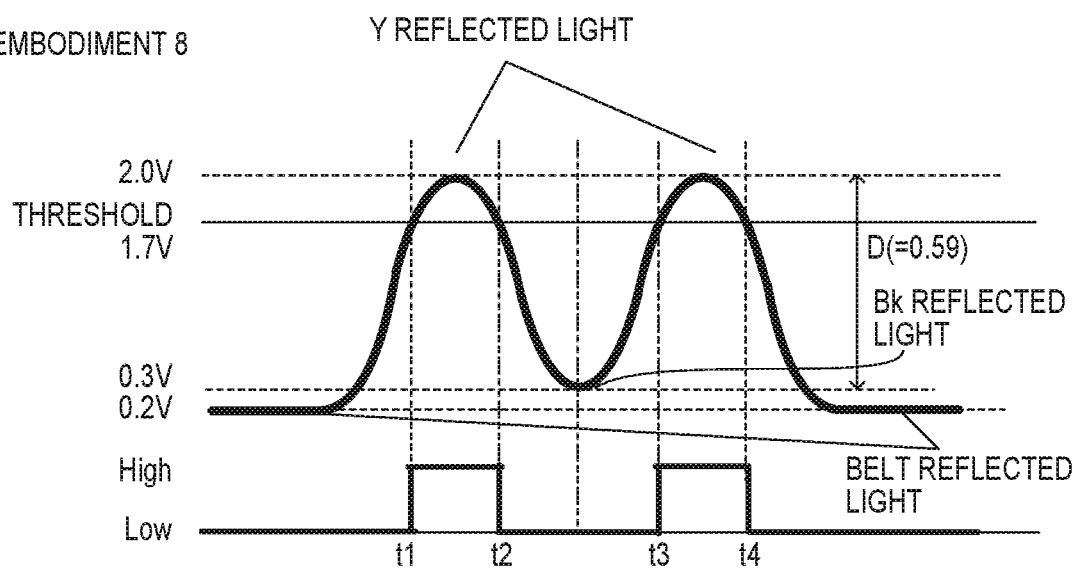

Embodiments 5 to 8 are overlapping patterns consisting of a halftone yellow pattern and a black pattern having a tone value of 100%. Representatively, FIG. 13A illustrates the detection waveform of the fifth embodiment. FIG. 13B illustrates the detection waveform of the eighth embodiment.

The fifth embodiment is an overlapping pattern consisting of a yellow pattern (halftone) having a tone value of 90% and a black pattern (solid) having a tone value of 100%. As shown FIG. 13A, in the fifth embodiment, since the tone value of the yellow pattern is 90%, the chromaticity is 90%. A part of the light irradiated onto the yellow pattern reaches the intermediate transfer belt 10. Almost no light is reflected from the intermediate transfer belt 10. Therefore, the detection result is 2.9V, which is lower than the detection result in a case where the tone value is 100%. The tone value of the black pattern is 100%, and the chromaticity is 100%. Almost no light is reflected from the yellow pattern formed as the lower layer of the black pattern. The detection result of the black pattern is 0.3V. The dynamic range D is 0.90, which crosses the threshold 1.7V. The distance between t1 and t4, which are timings for detecting the edges of the yellow pattern, is smaller than the distance shown in FIG. 6B. However, the center of gravity of t1 to t4 is substantially the same as the center of gravity obtained from FIG. 6B. The distance between t2 and t3, which are timings for detecting the edges of the black pattern, is wider than the distance shown in FIG. 6B. The center of gravity of t2 to t3 is substantially the same value as the center of gravity obtained from FIG. 6B. The fifth embodiment achieves detection accuracy similar to the detection waveform shown in FIG. 6B.

The sixth embodiment is an overlapping pattern consisting of a yellow pattern (halftone) having a tone value of 80% and a black pattern (solid) having a tone value of 100%. The detection result of the yellow pattern is 2.6V. The detection result of the black pattern is 0.3V. The dynamic range D is 0.79, which crosses the threshold 1.7V. Therefore, each edge of the yellow pattern and the black pattern can be detected.

The seventh embodiment is an overlapping pattern consisting of a yellow pattern (halftone) having a tone value of 70% and a black pattern (solid) having a tone value of 100%. The detection result of the yellow pattern is 2.3V. The detection result of the black pattern is 0.3V. The dynamic range D is 0.69, which crosses the threshold 1.7V. Therefore, each edge of the yellow pattern and the black pattern can be detected.

The eighth embodiment is an overlapping pattern consisting of a yellow pattern (halftone) having a tone value of 60% and a black pattern (solid) having a tone value of 100%. As shown in FIG. 13B, the detection result of the yellow pattern is 2.0V, but slightly larger than the threshold 1.7V. The detection result of the black pattern is 0.3V. The dynamic range D is 0.59, which crosses the threshold 1.7V. The distance between t1 to t4, which are timings for detecting the edges of the yellow pattern, is smaller than the distance shown in FIG. 6B. However, the center of gravity of t1 to t4 is substantially the same as the center of gravity obtained from FIG. 6B. The distance between t2 to t3, which are timings for detecting the edges of the black pattern, is wider than the distance shown in FIG. 6B. However, the center of gravity of t2 to t3 is substantially the same as the center of gravity obtained from FIG. 6B. Thus, the eighth embodiment achieves detection accuracy similar to the detection waveform shown in FIG. 6B.

Figure 14:
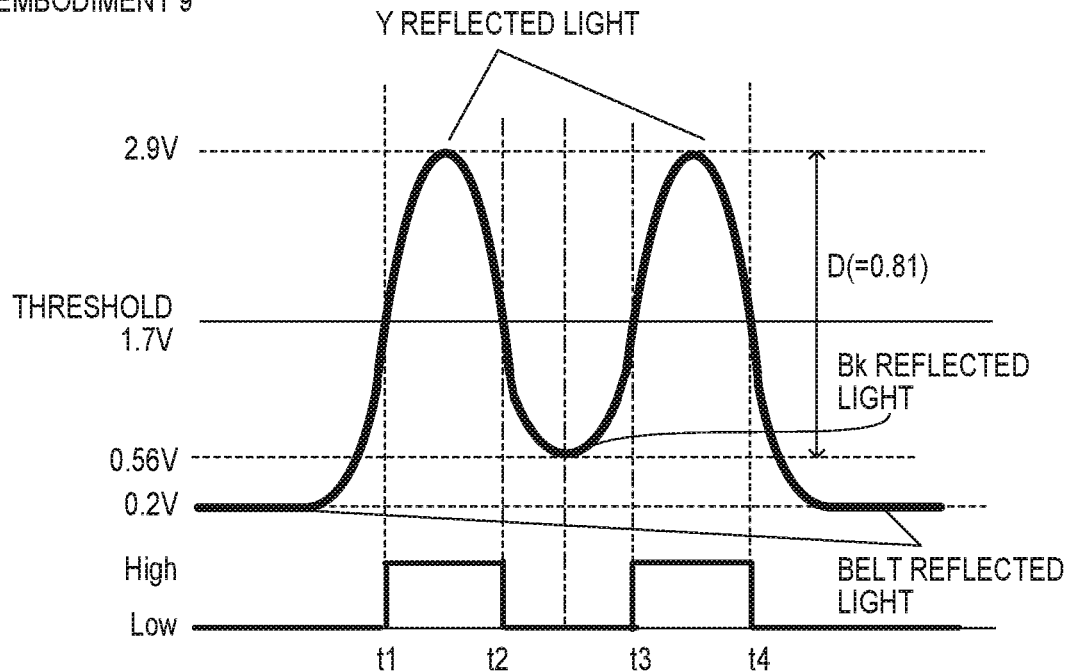
FIG. 14 is a view for describing a detection waveform of an overlapping pattern of a ninth embodiment.

Embodiments 9 and 10 are overlapping patterns consisting of a yellow pattern formed by a halftone and a black pattern formed by a halftone. FIG. 14 illustrates the detection waveform of the ninth embodiment.

The ninth embodiment is an overlapping pattern consisting of a yellow pattern (halftone) having a tone value of 90% and a black pattern (halftone) having a tone value of 90%. A part of the light irradiated onto the yellow pattern reaches the intermediate transfer belt 10. Almost no light is reflected from the intermediate transfer belt 10. Therefore, the detection result is 2.9V, which is lower than the detection result in a case where the tone value is 100%. The tone value of the black pattern is 90%. Therefore, the reflected light from the yellow pattern is included in the detection result of the black pattern. The detection result of the black pattern is 0.56V. The dynamic range D is 0.81, which crosses the threshold 1.7V. The distance between t1 to t4, which are timings for detecting the edges of the yellow pattern, is smaller than the distance shown in FIG. 6B. The center of gravity of t1 to t4 is substantially the same as the center of gravity obtained from FIG. 6B. The distance between t2 to t3, which are timings for detecting the edges of the black pattern, is smaller than the distance shown in FIG. 6B. The center of gravity of t2 to t3 is substantially the same as the center of gravity obtained from FIG. 6B. Thus, the ninth embodiment achieves detection accuracy similar to the detection waveform shown in FIG. 6B.

The tenth embodiment is an overlapping pattern consisting of a yellow pattern (halftone) having a tone value of 80% and a black pattern (halftone) having a tone value of 80%. The detection result of the yellow pattern is 2.6V. The detection result of the black pattern is 0.76V. The dynamic range D is 0.63, which crosses the threshold 1.7V. Therefore, each edge of the yellow pattern and the black pattern can be detected.

In the Embodiments 1 to 10, one or both of the yellow pattern and the black pattern are formed by halftones. The dynamic range D is smaller than when the tone values of the yellow pattern and the black pattern are respectively formed at 100%. Even so, the edge of the yellow pattern and the edge of the black pattern can be detected. Therefore, in the Embodiments 1 to 10, it is possible to decrease the amount of toner in the overlapping pattern while maintaining the detection accuracy of the color shift amount.

Figure 15:
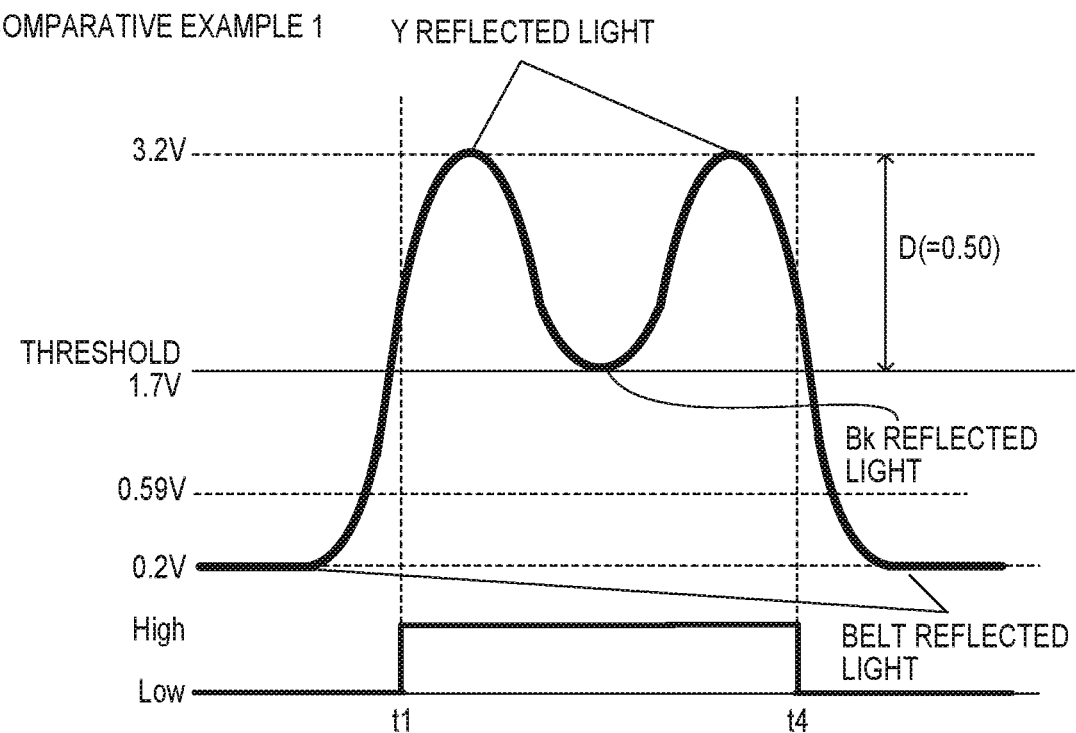
FIG. 15 is a view for describing a detection waveform of an overlapping pattern of a first comparative example.

Comparative Examples 1 to 5 are overlapping patterns consisting of a yellow pattern having a tone value of 100% and a halftone black pattern. Representatively, FIG. 15 shows the detection waveform of the overlapping pattern of the Comparative Example 1.

Comparative Example 1 is an overlapping pattern consisting of a yellow pattern having a tone value of 100% and a black pattern having a tone value of 50%. The detection result of the yellow pattern is 3.2V. The detection result of the black pattern is 1.75V. The dynamic range D is 0.50, which is above the 1.7V threshold. In the Comparative Example 1, the yellow pattern is detectable, but the black pattern is not detectable.

Comparative Example 2 is an overlapping pattern consisting of a yellow pattern having a tone value of 100% and a black pattern having a tone value of 40%. The detection result of the yellow pattern is 3.2V and the detection result of the black pattern is 2.04V. The dynamic range D is 0.40, which is above the 1.7V threshold. In the Comparative Example 2, the yellow pattern is detectable, but the black pattern is not detectable.

Comparative Example 3 is an overlapping pattern consisting of a yellow pattern having a tone value of 100% and a black pattern having a tone value of 30%. The detection result of the yellow pattern is 3.2V and the detection result of the black pattern is 2.33V. The dynamic range D is 0.30, which is above the 1.7V threshold. In the Comparative Example 3, the yellow pattern is detectable, but the black pattern is not detectable.

Comparative Example 4 is an overlapping pattern consisting of a yellow pattern having a tone value of 100% and a black pattern having a tone value of 20%. The detection result of the yellow pattern is 3.2V and the detection result of the black pattern is 2.62V. The dynamic range D is 0.20, which is above the 1.7V threshold. In the Comparative Example 4, the yellow pattern is detectable, but the black pattern is not detectable.

Comparative Example 5 is an overlapping pattern consisting of a yellow pattern having a tone value of 100% and a black pattern having a tone value of 10%. The detection result of the black pattern is 2.91V. The dynamic range D is 0.10, which is above the 1.7V threshold. In the Comparative Example 5, the yellow pattern is detectable, but the black pattern is not detectable.

In the Comparative Examples 1 to 5, since the density of the black pattern is thin, most of the irradiation light from the light emitting element 61 reaches the yellow pattern formed as the lower layer. Also, the light receiving element 63 detects diffuse reflected light from the yellow pattern. As a result, the dynamic range D is in a range of 0.1 to 0.5, which is smaller compared to the Embodiments 1 to 10. In addition, since both dynamic ranges D are positioned above the threshold 1.7V, the edges of the black pattern cannot be detected.

Figure 16:
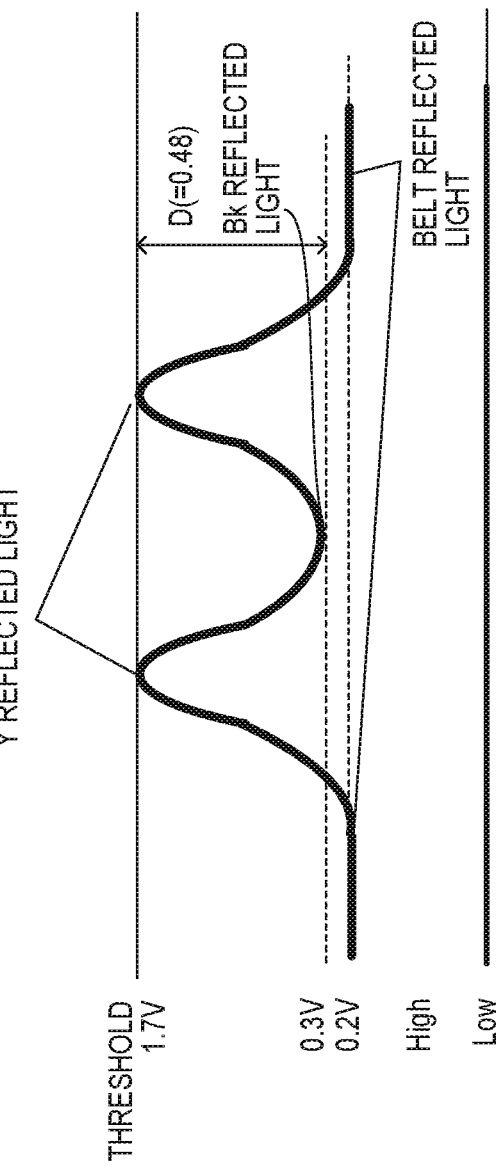
FIG. 16 is a view for describing a detection waveform of an overlapping pattern of a sixth comparative example.

Comparative Examples 6 to 10 are overlapping patterns consisting of a halftone yellow pattern and a black pattern having a tone value of 100%. Representatively, FIG. 16 shows the detection waveform of the overlapping pattern of the Comparative Example 6.

Comparative Example 6 is an overlapping pattern constituting a yellow pattern having a tone value of 50% and a black pattern having a tone value of 100%. As illustrated in FIG. 16, the detection result of the yellow pattern is 1.7V and the detection result of the black pattern is 0.3V. The dynamic range D is 0.48, which is below the 1.7V threshold. Therefore, neither the yellow pattern nor the black pattern can be detected.

Comparative Example 7 is an overlapping pattern constituting a yellow pattern having a tone value of 40% and a black pattern having a tone value of 100%. The detection result of the yellow pattern is 1.40V and the detection result of the black pattern is 0.3V. The dynamic range D is 0.38, which is below the 1.7V threshold. Therefore, neither the yellow pattern nor the black pattern can be detected.

Comparative Example 8 is an overlapping pattern constituting a yellow pattern having a tone value of 30% and a black pattern having a tone value of 100%. The detection result of the yellow pattern is 1.10V and the detection result of the black pattern is 0.3V. The dynamic range D is 0.28, which is below the 1.7V threshold. Therefore, neither the yellow pattern nor the black pattern can be detected.

Comparative Example 9 is an overlapping pattern constituting a yellow pattern having a tone value of 20% and a black pattern having a tone value of 100%. The detection result of the yellow pattern is 0.80V and the detection result of the black pattern is 0.3V. The dynamic range D is 0.17, which is below the 1.7V threshold. Therefore, neither the yellow pattern nor the black pattern can be detected.

Comparative Example 10 is an overlapping pattern constituting a yellow pattern having a tone value of 10% and a black pattern having a tone value of 100%. The detection result of the yellow pattern is 0.50V and the detection result of the black pattern is 0.3V. The dynamic range D is 0.07, which is below the 1.7V threshold. Therefore, neither the yellow pattern nor the black pattern can be detected.

In Comparative Examples 6 to 10, the yellow pattern is thin, and most of the irradiation light from the light emitting element 61 reaches the intermediate transfer belt 10. Almost no diffuse reflected light is reflected from the intermediate transfer belt 10. Therefore, the detection result of the yellow pattern is low. Since the tone value of the black pattern is 100%, most of the irradiation light from the light emitting element 61 is absorbed by the black pattern or becomes diffuse reflected light from the black pattern. Therefore, there is hardly any influence by the yellow pattern. As a result, the dynamic ranges D of Comparative Examples 6 to 10 are in the range of 0.07 to 0.48, and are smaller than the dynamic ranges of the Embodiments 1 to 10. The dynamic ranges D of the Comparative Examples 6 to 10 are all below the threshold 1.7V. Even so, the edge of the yellow pattern and the edge of the black pattern cannot be detected.

Figure 17:
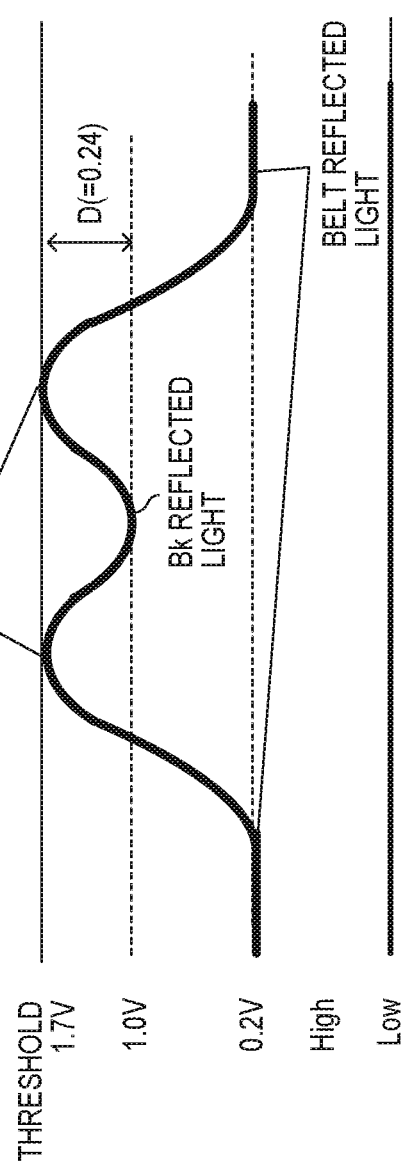
FIG. 17 is a view for describing a detection waveform of an overlapping pattern of an eleventh comparative example.

Comparative Examples 11 to 17 are overlapping patterns consisting of a halftone yellow pattern and a halftone black pattern. Representatively, FIG. 17 shows the detection waveform of the overlapping pattern of the Comparative Example 11.

Comparative Example 11 is an overlapping pattern constituting a yellow pattern having a tone value of 50% and a black pattern having a tone value of 50%. As illustrated in FIG. 17, the detection result of the yellow pattern is 1.7V and the detection result of the black pattern is 1.00V. The dynamic range D is 0.24, which is below the 1.7V threshold. Therefore, neither the yellow pattern nor the black pattern can be detected.

Comparative Example 12 is an overlapping pattern constituting a yellow pattern having a tone value of 40% and a black pattern having a tone value of 40%. The detection result of the yellow pattern is 1.4V and the detection result of the black pattern is 0.96V. The dynamic range D is 0.15, which is below the 1.7V threshold. Therefore, neither the yellow pattern nor the black pattern can be detected.

Comparative Example 13 is an overlapping pattern constituting a yellow pattern having a tone value of 30% and a black pattern having a tone value of 30%. The detection result of the yellow pattern is 1.1V and the detection result of the black pattern is 0.86V. The dynamic range D is 0.08, which is below the 1.7V threshold. Therefore, neither the yellow pattern nor the black pattern can be detected.

Comparative Example 14 is an overlapping pattern constituting a yellow pattern having a tone value of 20% and a black pattern having a tone value of 20%. The detection result of the yellow pattern is 0.8V and the detection result of the black pattern is 0.70V. The dynamic range D is 0.03 which is below the 1.7V threshold. Therefore, neither the yellow pattern nor the black pattern can be detected.

Comparative Example 15 is an overlapping pattern constituting a yellow pattern having a tone value of 10% and a black pattern having a tone value of 10%. The detection result of the yellow pattern is 0.5V and the detection result of the black pattern is 0.48V. The dynamic range D is 0.01, which is below the 1.7V threshold. Therefore, neither the yellow pattern nor the black pattern can be detected.

In the Comparative Examples 11 to 15, since the yellow pattern is thin, most of the irradiation light from the light emitting element 61 passes through the yellow pattern and reaches the intermediate transfer belt 10 positioned on the lower layer thereof. Almost no light is reflected from the intermediate transfer belt 10. Therefore, the yellow pattern cannot be detected. Since the overlapping pattern is also thin, much of the irradiation light from the light emitting element 61 reaches the intermediate transfer belt 10. Almost no light is reflected from the intermediate transfer belt 10. Therefore, the amount of light received from the overlapping pattern is small. The range of the dynamic range D is 0.01 to 0.24, and the edges of the yellow pattern and the edges of the black pattern cannot be detected.

Figure 18:
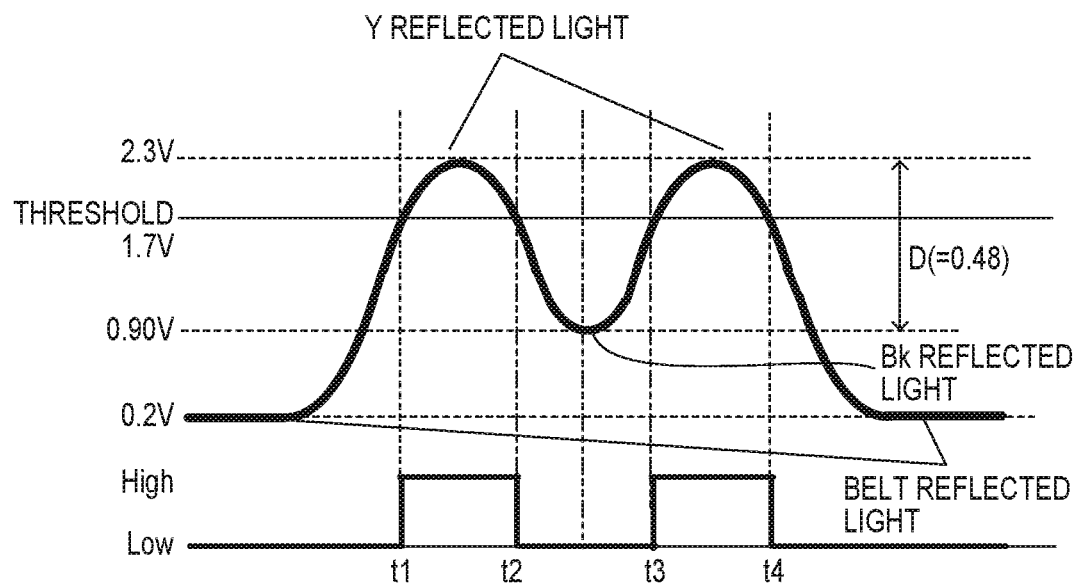
FIG. 18 is a view for describing a detection waveform of an overlapping pattern of a sixteenth comparative example.

Comparative Example 16 is an overlapping pattern constituting a yellow pattern having a tone value of 70% and a black pattern having a tone value of 70%. FIG. 18 is a detection waveform of an overlapping pattern of the Comparative Example 16. The detection result of the yellow pattern is 2.3V and the detection result of the black pattern is 0.90V. The dynamic range D is 0.48, which crosses the threshold 1.7V. Therefore, each edge of the yellow pattern and the black pattern can be detected. However, since the dynamic range D is small, the detection stability is low. In particular, a case in which the dynamic range D is positioned above or below the threshold is observed depending on the variation in chromaticity of the pattern or the variation in the amount of irradiated light.

Comparative Example 17 is an overlapping pattern constituting a yellow pattern having a tone value of 60% and a black pattern having a tone value of 60%. The detection result of the yellow pattern is 2.0V and the detection result of the black pattern is 0.98V. The dynamic range D is 0.35, which crosses the threshold 1.7V. Therefore, both the yellow pattern and the black pattern can be detected. However, since the dynamic range D is small, the detection stability is low.

From the above, a condition has been established in which a decrease in the amount of toner consumption and stabilization of color shift correction can both be achieved for an overlapping pattern. By forming one or both of the yellow pattern and the black pattern constituting the overlapping pattern by a halftone, the amount of toner consumption is decreased. Further, stabilization of a color shift correction is achieved by considering a dynamic range D when determining the tone value of the halftone. For example, the dynamic range D may be greater than 0.50. According to FIGS. 9A to 9C, it is shown that the stabilization of the color shift correction is achieved when the dynamic range D is 0.59 or more. Although not shown in FIGS. 9A to 9C, according to studies by the inventors, it was found that when a dynamic range D is 0.51 or more, a stabilization of a color shift correction is achieved.

In a case where the tone value of the black pattern is 100%, the dynamic range D becomes larger than 0.50 if the tone value of the yellow pattern is larger than 50%. In a case where the tone value of the yellow pattern is 100%, the dynamic range D becomes larger than 0.50 if the tone value of the black pattern is larger than 50%. Also, in a case where both the yellow pattern and the black pattern are halftones, the dynamic range D becomes larger than 0.50 if the tone value of both patterns is larger than 70%.

Here, when the tone value of the yellow pattern is 100% and the toner amount is 0.40 g/cm$^2$, the detection result is 3.2V. Although it has been mentioned that the irradiation light amount of the light emitting element 61 is adjusted, the irradiation light amount of the light emitting element 61 may shift from the target light amount depending on an error of adjustment. The surface of the intermediate transfer belt 10 may be raised by foreign matter adhering onto the support roller 11, and the distance between the optical sensor 60 and the intermediate transfer belt 10 may vary. As a result, the amount of light received by the light receiving element 63 may change. For such variations, there may be a more appropriate range of the dynamic range D for detecting the overlapping pattern in a stable manner.

The detection stability indicated in FIGS. 9A to 9C indicates whether the detection of the overlapping pattern is stable throughout heavy use of the image forming apparatus 100. ⊚ indicates that a failure has not occurred in detecting the overlapping pattern even when the image forming apparatus 100 has been used for a long time. ○ indicates that a failure has on rare occasions occurred in detecting the overlapping pattern, but that detection accuracy has been restored by adjusting the irradiation light amount of the light emitting element 61. Δ indicates that edge detection has been successful but unstable. × indicates that edge detection has failed. In the comparative examples, although the overlapping pattern can be temporarily detected by adjusting the irradiation light amount of the light emitting element 61, a detection failure often occurs. In the Embodiments 1, 2, 5, 6, 7, 9, and 10, a detection failure did not occur, but in the Embodiments 3 and 4, a pattern detection failure occurred in a case where the toner of the yellow cartridge deteriorated. This is mainly due to cases where the amount of light received by the light receiving element 63 increases due an effect of foreign matter adhering onto the support roller 11 and the detection result of the black pattern exceeding the threshold 1.7V. In the Embodiments 8, 11, and 12, there is a case where the amount of light irradiated by the light emitting element 61 is smaller than a target amount of light, and the detection result of the yellow pattern is below the threshold 1.7V. Therefore, when more emphasis is placed on stability, the tone value of each pattern should be set so that the dynamic range D is greater than 0.69.

(2) Omission of Density Correction

Figure 19:
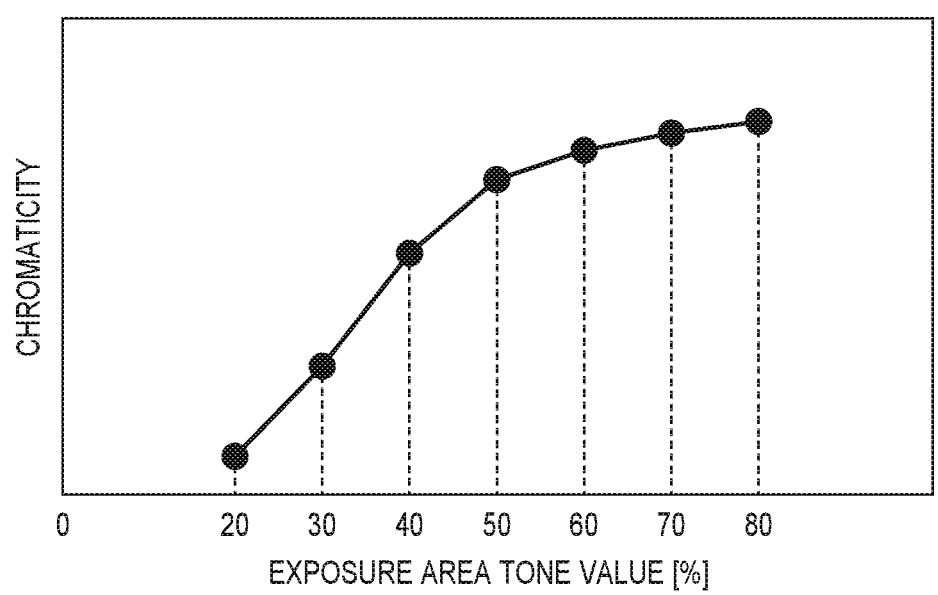
FIG. 19 is a view for describing a relationship between exposure area tone value and chromaticity.

Here, the tone value of the overlapping pattern is set in a state where the density correction has been performed. However, the density correction may be omitted. FIG. 19 illustrates an example of a relationship between a tone value in a state where no density correction has been performed and a chromaticity of yellow. In other words, the tone value in FIG. 19 corresponds to the area ratio of exposure by the exposure apparatus 3 when forming the toner pattern. Hereinafter, the tone is referred to as an exposure area tone value (exposure area ratio).

FIG. 19 shows the measurement results of the chromaticity when the set exposure area tone value is 20%, 30%, 40%, 50%, 60%, 70%, and 80%. As shown in FIG. 19, in a case where the density correction is not performed, the relationship between the exposure area tone value and the chromaticity is not linear. In particular, when the exposure area tone value is 50% or more, the chromaticity is saturated.

Therefore, the exposure area tone value of the overlapping pattern may be set such that the dynamic range D is greater than 0.5 or is even greater than 0.7. By using the tone of the area where chromaticity is saturated without performing density correction, the detection result of the overlapping pattern is less likely to vary.

Here, an overlapping pattern is formed by a dither pattern having a number of lines of 150 lpi, but this is merely an example. The toner pattern may be formed with a number of lines (e.g., 100 lpi or more and 220 lpi or less) that differs from 150 lpi. The higher the number of lines, the less jaggies occur at the edges of the toner pattern. As a result, there is an advantage that the detection waveform of the toner pattern is smoother. Meanwhile, as the number of lines decreases, the chromaticity of the toner pattern with respect to the exposure amount becomes more stable. In view of the accuracy, stability, and the like of the color shift correction, an appropriate number of lines may be selected from the range of 100 lpi or more and 220 lpi or less. In addition, the number of lines when forming the test image may be different from the number of lines when forming a user image prepared by the user.

Here, a method of detecting diffuse reflected light using the light receiving element 63 has been introduced as a method of detecting a test image for color shift correction. However, this is only an example. The edge of each toner pattern may be detected from the difference between the reflected light of the black pattern constituting the overlapping pattern and the reflected light of the toner pattern of another color (e.g., yellow). Therefore, the CPU 276 may cause the light receiving element 62 to detect the specular reflected light, and execute color shift correction based on the detection result.

7. Other Embodiments

Figure 20:
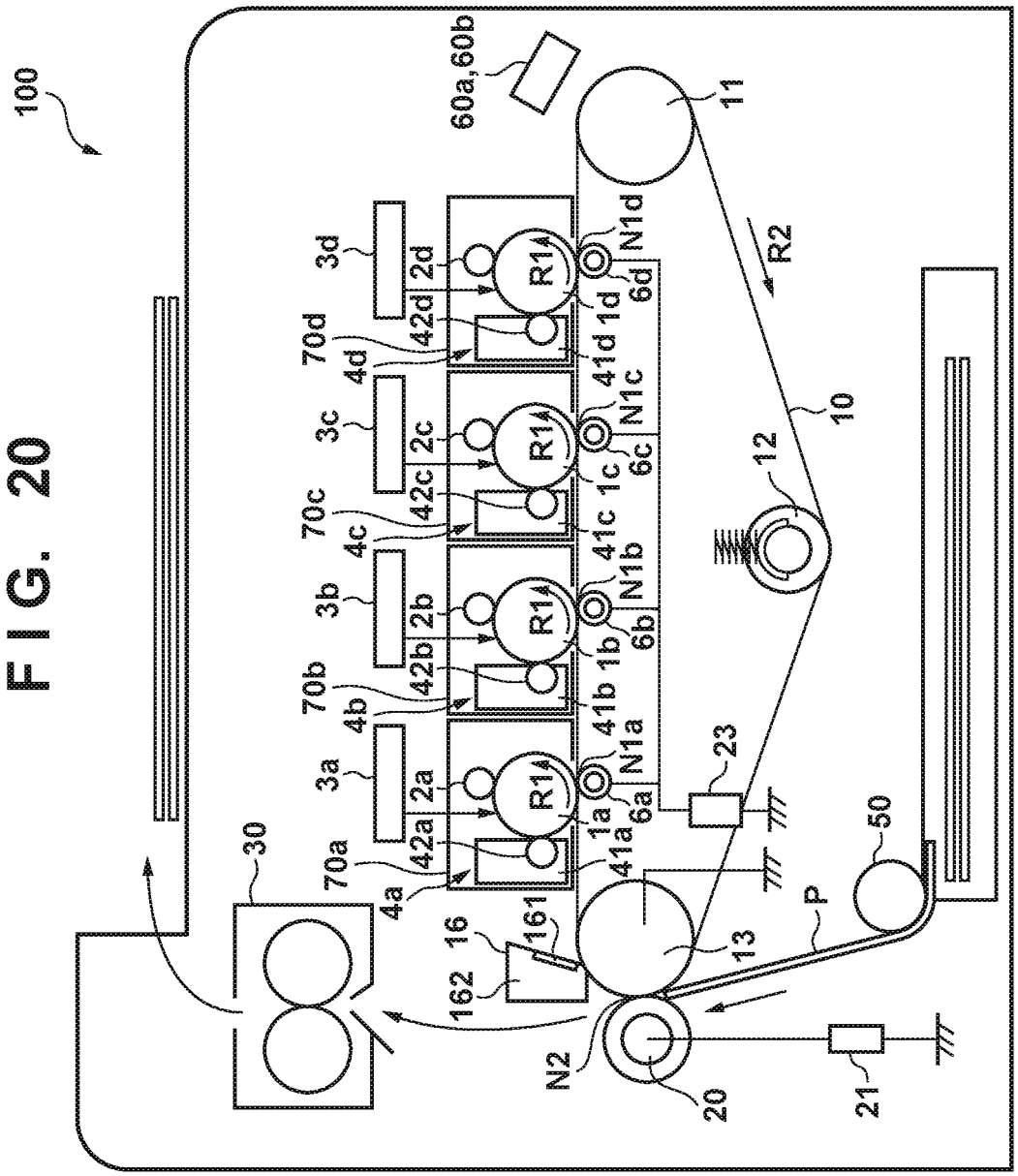
FIG. 20 is a view for describing another example of an image forming apparatus.

FIG. 20 illustrates another configuration example of the image forming apparatus 100. The image forming apparatus 100 illustrated in FIG. 20 does not have a drum cleaner. Therefore, the developing roller 42 collects residual toner. As a result, the drum cleaner 5 and the residual toner collection box are not required, and a reduction in the size of the image forming apparatus 100 is realized.

Residual toner that cannot be collected by the developing roller 42 is transferred onto the intermediate transfer belt 10 at the primary transfer nip N1, which may cause an image defect referred to as so-called ghosting. In order to decrease the occurrence of ghosting, it is necessary to reduce the residual toner on the photosensitive drum 1. For example, when the primary transfer voltage for yellow is increased, the polarity of the toner on the intermediate transfer belt 10 may be reversed by a discharge current from the magenta photosensitive drum 1 and transferred onto the magenta photosensitive drum 1. This is a phenomenon referred to as re-transfer. Re-transferred toner adheres to the charging roller 2 and causes a charge defect. When the toner is collected by the magenta developing roller 42, the yellow toner and the magenta toner are mixed. Therefore, the present embodiment realizes stable color shift correction while decreasing the occurrence of ghosting by forming an overlapping pattern with a halftone. All of tone values described herein are expressed in units of % of exposure area tone value.

FIG. 21 shows the exposure area tone value, the amount of toner, and a ghosting occurrence rank. A rank is a rank in which no ghosting occurs. B rank is a rank in which slight ghosting has occurred on the intermediate transfer belt 10. C rank is a rank in which apparent ghosting has occurred on the intermediate transfer belt 10. The relationship between the exposure area tone value and the chromaticity in the overlapping pattern shown in FIG. 21 is similar to the relationship shown in FIG. 19.

B rank ghosting occurs when the exposure area tone value becomes 98% or more in a case where the tone of the yellow pattern and the tone of the black pattern are each changed by the same value. Therefore, the exposure area tone value of the sum of the yellow pattern and the black pattern may be smaller than 196%.

In a case where the exposure area tone value of the yellow pattern is 99% and the exposure area tone value of the black pattern is 100%, C rank ghosting occurs. In a case where the exposure area tone value of the yellow pattern is 100% and the exposure area tone value of the black pattern is 99%, B rank ghosting occurs. This indicates that it is advantageous to set the exposure area tone value of the black pattern lower than the exposure area tone value of the yellow pattern. In other words, when the exposure amount of the photosensitive drum 1d is decreased, the surface potential of the photosensitive drum 1d becomes larger to the negative side compared to the surface potential when the exposure area tone value is 100%. As a result, the primary transfer contrast between the surface potential and the primary transfer voltage increases. As described above, in order to decrease the occurrence of ghosting, it is effective to set the exposure area tone value of the photosensitive drum 1 on the downstream side in the rotation direction of the intermediate transfer belt 10 to be smaller than the exposure area tone value of the photosensitive drum 1 on the upstream side. Here, it is effective to set the exposure area tone value of the black pattern to 97% or less. If the exposure area tone value is set to 95% or less, the occurrence of ghosting will be sufficiently decreased even if the charge amount of the toner and the stability of the toner amount decrease.

The relationship between the exposure area tone value and the chromaticity shown in FIG. 19 is an advantageous relationship for the stability of detection of the test image and suppressing the occurrence of ghosting. By selecting the exposure area tone belonging to an area where the chromaticity is saturated, the detection waveform of the overlapping pattern becomes substantially similar to the detection waveform in a case where the exposure area tone value is formed at 100%. That is, even if the exposure area tone value is lowered below 100%, the effect thereof on the color shift correction becomes almost nothing or nothing. In addition, the exposure area tone value may be set so that the dynamic range D is larger than 0.90.

8. CPU Functions

Figure 22:
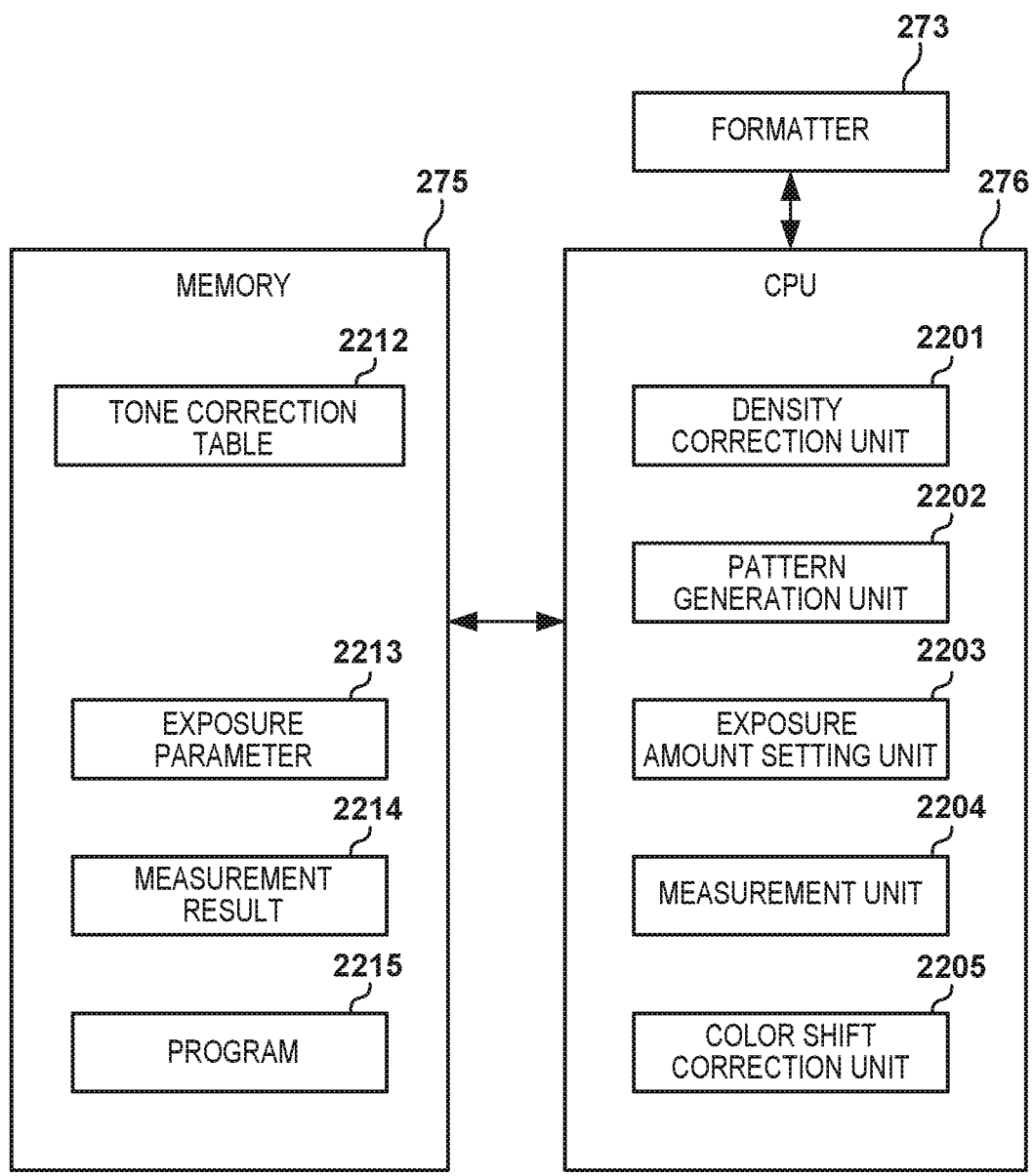
FIG. 22 is a view for describing functions of a CPU.

FIG. 22 shows functions realized by the CPU 276 executing a program 2215 stored in the memory 275. A density correction unit 2201 creates a tone correction table 2212 based on the detection result of the test image for density correction by the optical sensor 60. The formatter 273 refers to the tone correction table 2212 and converts the input image data into output image data.

A pattern generation unit 2202 generates image data that is a source of the test images 700a and 700b for color shift correction, and provides the generated image data to the formatter 273. An exposure amount setting unit 2203 sets an exposure amount of a plurality of toner patterns constituting the test images 700a and 700b based on the exposure parameter 2213. Here, exposure parameters 2213 are parameters that satisfy any of the above-described Embodiments 1 to 10. The exposure parameters 2213 may satisfy any one of the Embodiments 1 to 10. Alternatively, the exposure parameters 2213 satisfying each of the Embodiments 1 to 10 may be stored in the memory 275, and one of them may be read out by the CPU 276.

A measurement unit 2204 calculates the color shift amount (a measurement result 2214) of a measurement target color with respect to a reference color based on a detection result of the test images 700a and 700b by the optical sensors 60a and 60b. A color shift correction unit 2205 corrects, based on the measurement result 2214, the exposure timing of the measurement target color so that the color shift is decreased.

9. Flowchart

Figure 23:
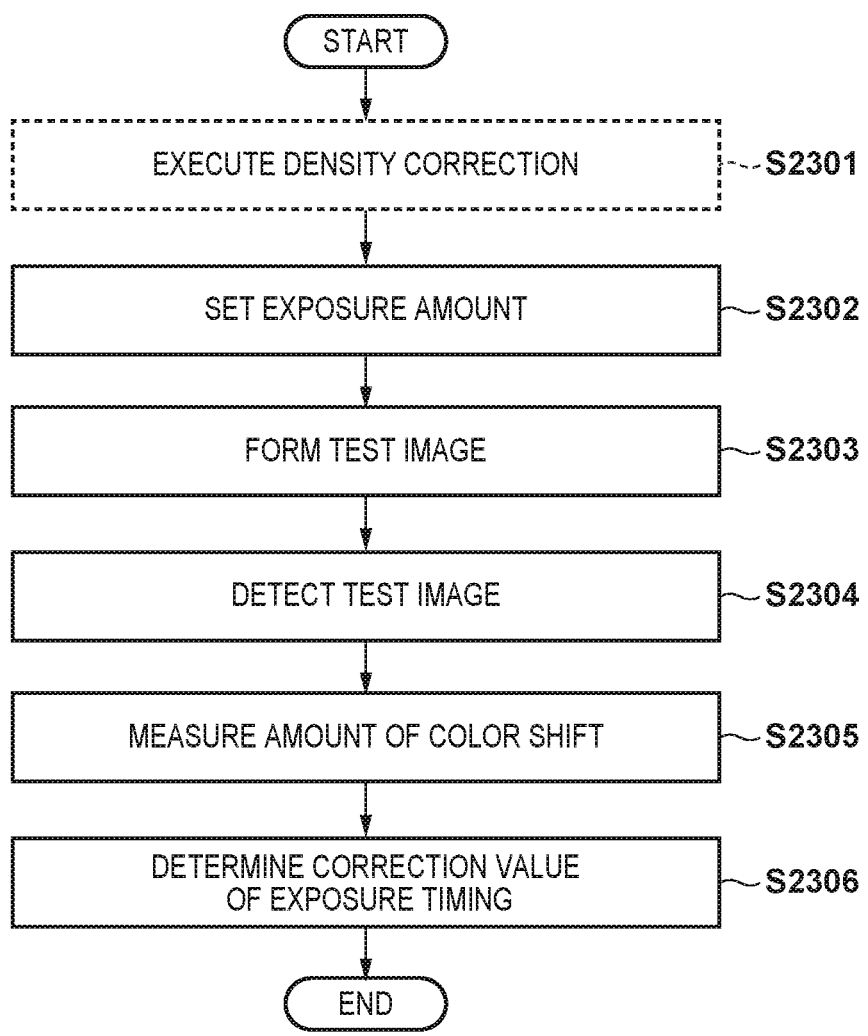
FIG. 23 is a flowchart for describing a color shift correction method.

FIG. 23 illustrates the color shift correction method executed by the CPU 276 according to the program 2215. When an execution instruction is inputted by the user and the number of images to be formed reaches a predetermined number, the CPU 276 starts the color shift correction.

In step S2301, the CPU 276 (the density correction unit 2201) executes density correction. The density correction unit 2201 creates the tone correction table 2212 by density correction and stores it in the memory 275. Note, the density correction is optional and may be omitted. For example, the CPU 276 may accept a user input and select whether to execute density correction or skip density correction according to the user input.

In step S2302, the CPU 276 (the exposure amount setting unit 2203) sets an exposure amount (tone value) of each toner pattern constituting the test images 700a and 700b based on the exposure parameter 2213.

In step S2303, the CPU 276 causes the pattern generation unit 2202 to create original data of the test images 700a and 700b, and outputs the original data to the formatter 273, thereby forming the test images 700a and 700b on the intermediate transfer belt 10.

In step S2304, the CPU 276 (the measurement unit 2204) controls the optical sensors 60a and 60b to detect the test images 700a and 700b formed on the intermediate transfer belt 10.

In step S2305, the CPU 276 (the measurement unit 2204) measures the amount of color shift based on the detection result of the test images 700a and 700b. The measurement unit 2204 stores the measurement result 2214 of the color shift amount in the memory 275.

In step S2306, the CPU 276 (the color shift correction unit 2205) determines a correction value for the exposure timings of each color based on the measurement result 2214 of the color shift amount. In particular, a correction value for the exposure timing of the color to be measured is determined. When the user inputs the print instruction, the CPU 276 corrects the exposure timing by using the correction value.

10. Technical Ideas Derived from the Embodiments

[Aspect 1]

The developer 4 is an example of a developing unit that forms a toner image by developing an electrostatic latent image formed on a surface of an image carrier by an exposure unit with toner. The image forming units 70a to 70d are exemplary image forming units that have an image carrier, a charging unit, an exposure unit, and a developing unit. The intermediate transfer belt 10 is an example of an intermediate transfer member to which a plurality of toner images of different colors are transferred from the plurality of image forming units. The optical sensors 60a and 60b function as detection units that detect a correction pattern (e.g., the test images 700a and 700b) for correcting a positional shift between a plurality of toner images formed on the intermediate transfer member. The controller 274 and the CPU 276 are exemplary control units that control the plurality of image forming units based on detection results of the detection units.

As exemplified in FIGS. 3A and 3B, light emitting element 61 is an example of a light emitting element that irradiates the intermediate transfer member with light. The light receiving elements 62 and 63 are examples of light receiving elements that receive the reflected light reflected by either the intermediate transfer member or the correction pattern from the light outputted from the light emitting element.

As exemplified in FIG. 7, the magenta monochromatic patterns 701m, 705m, 711m, and 715m and the cyan monochromatic patterns 704c, 708c, 714c, and 718c are exemplary monochromatic patterns consisting of third or fourth monochromatic toner images. The overlapping pattern 600 is an example of an overlapping pattern in which a first monochromatic toner image (e.g., yellow) is formed as a lower layer, and a second monochromatic toner image (e.g., black) having a smaller area than the first monochromatic toner image is formed as an upper layer. Note that magenta or cyan may be utilized as the first monochromatic color instead of yellow.

As described in FIGS. 6A and 6B, the second monochromatic toner image in the overlapping pattern is detected based on the difference between the reflected light from the first monochromatic toner image and the reflected light from the second monochromatic toner image. This is because the color of the surface of the intermediate transfer belt 10 is close to or the same as the second monochromatic color. The dynamic range D indicates a difference between the first received light amount obtained by the light receiving element receiving the reflected light from the first monochromatic toner image and the second received light amount obtained by the light receiving element receiving the reflected light of the second monochromatic toner image. The dynamic range D is defined as 1 when a first monochromatic toner image and a second monochromatic toner image are formed by using an exposure amount corresponding to tone value of 100%. The CPU 276 controls the exposure unit to form an overlapping pattern such that the dynamic range D is less than 1.0 and larger than 0.5. This makes it possible to achieve both a decrease in the amount of toner consumption in the test image used for color shift correction and a stable detection of the test image.

[Aspect 2]

As exemplified in FIG. 10C, the tone value and the chromaticity may be proportional to each other.

[Aspect 3]

As described in relation to FIGS. 9A to 9C, the tone value of the second monochromatic (black) toner image may be adjusted to realize an appropriate overlapping pattern. In particular, the tone value of the second monochromatic (black) toner image may be adjusted to be less than 100%. By this, the consumption amount of the second monochromatic (black) toner is decreased. Experience has shown that the consumption amount of the second monochromatic (black) toner is greater than the consumption amount of the other toners. Therefore, decreasing the consumption amount of the second monochromatic (black) toner has a great advantage for the user.

[Aspect 4]

As described in relation to FIGS. 9A to 9C, the tone value of the second monochromatic (black) toner image may be 60% or greater and less than 100%. The tone value of the second monochromatic (black) toner image may be 100%, but by setting the tone value of the second monochromatic (black) toner image to be less than 100%, the consumption amount of the second monochromatic (black) toner is decreased.

[Aspect 5]

As exemplified in FIGS. 9A to 9C, if the dynamic range D is less than 1.0 and 0.7 or more, the stability of detection of the overlapping pattern is further improved.

[Aspect 6]

As exemplified in FIG. 9A to 9C, if the tone value of the second monochromatic (black) toner image is 70% or more and less than 100%, the stability of detection of the overlapping pattern is further improved. For example, a combination of tone values as shown in Embodiments 1, 2, 3, 5 to 7, 9, and 10 may be selected.

[Aspects 7 and 8]

A dither pattern suitable for detection of a test image may differ from a dither pattern suitable for a user image. Thus, they may be different from each other.

[Aspect 9]

By utilizing a number of lines suitable for detection of the test image, both a decrease in the amount of toner consumption and stability of detection can be achieved.

[Aspect 10]

The number of lines of the dither pattern is, for example, 150 lpi.

[Aspect 11]

As described in relation to FIG. 21, the tone value may be an exposure area ratio (exposure area tone value) according to the exposure unit.

[Aspect 12]

As described in relation to FIG. 21, if the exposure area tone value is 60% or more and 97% or less, ghosting is decreased.

[Aspect 13]

As described in connection with FIG. 20, configuration may be taken such that the developing unit collects toner remaining on the image carrier. As described in relation to FIG. 21, the exposure area tone value of the yellow pattern forming the overlapping pattern may be equal to the exposure area tone value of the black pattern. In this case, if the sum of these values is less than 196%, ghosting is decreased.

[Aspect 14]

As described in relation to FIG. 21, the exposure area tone value of the black toner image is smaller than the exposure area tone value of the yellow toner image. By this, ghosting may be decreased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-086233, filed May 26, 2022, which is hereby incorporated by reference herein in its entirety.

What is claimed is:

1. An image forming apparatus comprising:
a plurality of image forming units each having an image carrier, an exposure unit configured to form an electrostatic latent image by exposing a surface of the image carrier, and a developing unit configured to form a toner image by developing, with toner, the electrostatic latent image formed on the surface of the image carrier by the exposure unit;
an intermediate transfer member on which a plurality of toner images of different colors are transferred from the plurality of image forming units;
a sensor configured to detect a correction pattern in order to correct a positional shift of an image formed on the intermediate transfer member; and
a controller configured to control the plurality of image forming units based on a detection result of the sensor, wherein
the sensor includes:
a light emitting element configured to irradiate the intermediate transfer member with light,
a light receiving element configured to receive light reflected by either the intermediate transfer member or the correction pattern from the light outputted from the light emitting element, and
the correction pattern includes:
an overlapping pattern on which a first monochromatic toner image is formed as a lower layer and a second monochromatic toner image having a smaller area than the first monochromatic toner image is formed as an upper layer, and
the controller controls the plurality of image forming units to form the overlapping pattern such that a dynamic range D, which is calculated from a first received light amount V1 obtained by the light receiving element receiving light reflected from the first monochromatic toner image, a second received light amount V2 obtained by the light receiving element receiving light reflected from the second monochromatic toner image, a received light amount V1' of a case where a tone value of the first monochromatic toner image is 100%, and a received light amount V2' of a case where a tone value of the second monochromatic toner image is 100%, becomes less than 1.0 and greater than 0.5, where D=(V1−V2)/(V1'−V2').

2. The image forming apparatus according to claim 1, wherein
a proportional relationship exists between the tone value of the first monochromatic toner image and chromaticity, and
a proportional relationship exists between the tone value of the second monochromatic toner image and chromaticity.

3. The image forming apparatus according to claim 1, wherein
the controller makes the dynamic range D less than 1.0 and greater than 0.5 in the overlapping pattern by adjusting the tone value of the second monochromatic toner image formed on the upper layer in the overlapping pattern.

4. The image forming apparatus according to claim 1, wherein
the controller sets the tone value of the second monochromatic toner image formed on the upper layer in the overlapping pattern to 60% or more and less than 100%.

5. The image forming apparatus according to claim 1, wherein
the controller adjusts at least one of an exposure amount of the first monochromatic toner image and an exposure amount of the second monochromatic toner image such that the dynamic range D is less than 1.0 and 0.7 or more.

6. The image forming apparatus according to claim 1, wherein
the controller is further configured to:
set the tone value of the second monochromatic toner image formed on the upper layer of the overlapping pattern to 70% or more and less than 100%, and
set the tone value of the first monochromatic toner image formed on the lower layer of the overlapping pattern to 80% or more and less than 100%.

7. The image forming apparatus according to claim 1, wherein
the controller adjusts an exposure amount by the exposure unit by applying a dither pattern on image data that is the source of the overlapping pattern.

8. The image forming apparatus according to claim 7, wherein
a number of lines of the dither pattern used for forming the overlapping pattern and a number of lines of a dither pattern used for forming a user image that has been prepared by a user are different.

9. The image forming apparatus according to claim 8, wherein
the number of lines of the dither pattern is 100 lpi or more and 220 lpi or less.

10. The image forming apparatus according to claim 9, wherein
the number of lines of the dither pattern is 150 lpi.

11. The image forming apparatus according to claim 1, wherein
an exposure area tone value of the first monochromatic toner image by the exposure unit is equal to the tone value of the first monochromatic toner image, and
an exposure area tone value of the second monochromatic toner image by the exposure unit is equal to the tone value of the second monochromatic toner image.

12. The image forming apparatus according to claim 11, wherein
an exposure area tone value of the second monochromatic toner image formed on the upper layer in the overlapping pattern is 60% or more and 97% or less.

13. The image forming apparatus according to claim 1, wherein
the developing unit is configured to collect toner remaining on the image carrier,
the plurality of image forming units include:
a first image forming unit configured to form the first monochromatic toner image, and
a second image forming unit configured to form the second monochromatic toner image,
the first image forming unit is positioned downstream of the second image forming unit in the rotation direction of the intermediate transfer member, and
an exposure area tone value of the second monochromatic toner image formed on the upper layer in the overlapping pattern and an exposure area tone value of the first monochromatic toner image formed on the lower layer of the overlapping pattern are equal and the sum therebetween is less than 196%.

14. The image forming apparatus according to claim 1, wherein
the developing unit is configured to collect toner remaining on the image carrier,
the plurality of image forming units include:
a first image forming unit configured to form the first monochromatic toner image, and
a second image forming unit configured to form the second monochromatic toner image,
the first image forming unit is positioned downstream of the second image forming unit in the rotation direction of the intermediate transfer member, and
an exposure area tone value of the second monochromatic toner image formed on the upper layer in the overlapping pattern is less than an exposure area tone value of the first monochromatic toner image formed on the lower layer of the overlapping pattern.

15. The image forming apparatus according to claim 1, wherein
the second monochromatic toner image in the overlapping pattern is detected based on a difference between light reflected from the first monochromatic toner image and light reflected from the second monochromatic toner image.

16. An image forming apparatus comprising:
a plurality of image forming units each having an image carrier, an exposure unit configured to form an electrostatic latent image by exposing a surface of the image carrier, and a developing unit configured to form a toner image by developing, with toner, the electrostatic latent image formed on the surface of the image carrier by the exposure unit;
an intermediate transfer member on which a plurality of toner images of different colors are transferred from the plurality of image forming units;
a sensor configured to detect a correction pattern in order to correct a positional shift of an image formed on the intermediate transfer member; and
a controller configured to control the plurality of image forming units based on the detection result of the sensor, wherein
the sensor includes:
a light emitting element configured to irradiate the intermediate transfer member with light, and
a light receiving element configured to receive light reflected by either the intermediate transfer member or the correction pattern from light outputted from the light emitting element, the correction pattern includes:
an overlapping pattern on which a first monochromatic toner image is formed as a lower layer and a second monochromatic toner image having a smaller area than the first monochromatic toner image is formed as an upper layer, a first received light amount obtained by the light receiving element receiving light reflected from the first monochromatic toner image is greater than a threshold and a second received light amount obtained by the light receiving element receiving light reflected from the second monochromatic toner image is less than the threshold, a tone value of either one of the first monochromatic toner image and the second monochromatic toner image is formed at less than 100%, the controller adjusts an exposure amount by the exposure unit by applying a dither pattern on image data that is the source of the overlapping pattern, and a number of lines of the dither pattern used for forming the overlapping pattern and a number of lines of a dither pattern used for forming a user image that has been arbitrarily prepared by a user are different.

17. The image forming apparatus according to claim 16, wherein
the controller sets the tone value of the second monochromatic toner image formed on the upper layer in the overlapping pattern to 60% or more and less than 100%.

18. The image forming apparatus according to claim 16, wherein
the controller is further configured to:
set the tone value of the second monochromatic toner image formed on the upper layer of the overlapping pattern to 70% or more and less than 100%, and
set the tone value of the first monochromatic toner image formed on the lower layer of the overlapping pattern to 80% or more and less than 100%.

19. The image forming apparatus according to claim 16, wherein
the number of lines of the dither pattern is 100 lpi or more and 220 lpi or less.

20. The image forming apparatus according to claim 19, wherein
the number of lines of the dither pattern is 150 lpi.

* * * * *